(12) United States Patent
Powell et al.

(10) Patent No.: US 11,315,053 B1
(45) Date of Patent: Apr. 26, 2022

(54) SYSTEMS AND METHODS FOR OPTIMIZING COMPLEX SYSTEMS

(71) Applicant: TensorDRO, Inc., Nashville, TN (US)

(72) Inventors: G. Edward Powell, Nashville, TN (US); Mark T. Lane, Franklin, TN (US)

(73) Assignee: TensorX, Inc., Nashville, TN (US)

( * ) Notice: Subject to any disclaimer, the term of this patent is extended or adjusted under 35 U.S.C. 154(b) by 0 days.

(21) Appl. No.: 16/789,505

(22) Filed: Feb. 13, 2020

(51) Int. Cl.
| | |
|---|---|
| *G06Q 10/06* | (2012.01) |
| *B23K 26/384* | (2014.01) |
| *G05B 13/02* | (2006.01) |
| *G06Q 10/08* | (2012.01) |
| *B23K 26/03* | (2006.01) |
| *B23K 26/40* | (2014.01) |
| *B23K 31/10* | (2006.01) |
| *G05B 13/04* | (2006.01) |
| *F01D 5/14* | (2006.01) |
| *B23K 101/00* | (2006.01) |

(52) U.S. Cl.
CPC ....... *G06Q 10/06313* (2013.01); *B23K 26/03* (2013.01); *B23K 26/384* (2015.10); *B23K 26/40* (2013.01); *B23K 31/10* (2013.01); *G05B 13/0265* (2013.01); *G05B 13/042* (2013.01); *G06Q 10/06316* (2013.01); *G06Q 10/063112* (2013.01); *G06Q 10/08* (2013.01); *B23K 2101/001* (2018.08); *F01D 5/14* (2013.01); *F05D 2220/30* (2013.01); *F05D 2230/13* (2013.01); *F05D 2270/3062* (2013.01)

(58) Field of Classification Search
CPC .................................................. G06Q 10/08
See application file for complete search history.

(56) References Cited

U.S. PATENT DOCUMENTS

| | | | | |
|---|---|---|---|---|
| 6,233,493 | B1 * | 5/2001 | Cherneff | G06Q 10/06 700/95 |
| 8,261,218 | B1 * | 9/2012 | Fung | G06F 30/34 716/108 |
| 2002/0026342 | A1 * | 2/2002 | Lane | G06Q 10/04 705/7.22 |

(Continued)

FOREIGN PATENT DOCUMENTS

WO     WO-2018097836 A1 *    5/2018     ........... G08G 5/0034

OTHER PUBLICATIONS

"Joan Sala Reixach, Constraint Programming based Local Search for the Vehicle Routing Problem with Time Windows, 2012" (Year: 2012).*

(Continued)

*Primary Examiner* — Santosh R Poudel

(57) ABSTRACT

A computer-implemented method for optimizing control of a process includes a computer receiving a process definition and a collection of elements to be arranged in a way that optimizes the utility of the process; initializing the process using a collection of discrete elements (stops, events, work orders, tasks, locations, etc.), and producing a solution for the collection by inserting the elements into the solution using the Minimum Insertion Heuristic; modifying the order of the elements to be inserted and continuing the process to produce solutions with better scores; and continuing to produce solutions based on improving the order of insertion until the process is determined to be sufficiently optimized.

20 Claims, 23 Drawing Sheets

(56) References Cited

U.S. PATENT DOCUMENTS

| | | | | |
|---|---|---|---|---|
| 2003/0028407 | A1* | 2/2003 | Ibaraki | B23K 26/0673 |
| | | | | 700/173 |
| 2003/0220828 | A1* | 11/2003 | Hwang | G06Q 10/06 |
| | | | | 700/44 |
| 2005/0067394 | A1* | 3/2005 | Vaidyanathan | B23K 26/382 |
| | | | | 219/121.83 |
| 2008/0077464 | A1* | 3/2008 | Gottlieb | G06Q 10/087 |
| | | | | 705/28 |
| 2013/0346057 | A1* | 12/2013 | Lin | H02J 3/00 |
| | | | | 703/18 |
| 2015/0021304 | A1* | 1/2015 | Ozawa | B23K 26/382 |
| | | | | 219/121.71 |
| 2017/0152744 | A1* | 6/2017 | Mladjan | E21B 7/15 |
| 2019/0180397 | A1* | 6/2019 | Tu | G06Q 10/1095 |
| 2019/0188608 | A1* | 6/2019 | Gururajan | G06Q 10/02 |
| 2020/0056900 | A1* | 2/2020 | Lee | G08G 5/0069 |
| 2020/0104276 | A1* | 4/2020 | Parnell | G06N 20/00 |
| 2020/0104782 | A1* | 4/2020 | Katz | G16H 20/30 |

OTHER PUBLICATIONS

"Annibale et al,. A new meta-heuristic for the Bus Driver Scheduling Problem: GRASP combined with Rollout, 2007, IEEE, https://ieeexplore.ieee.org/document/4218616, p. 193" (Year: 2007).*

"Bashiri et al., An analytical comparison to heuristic and meta-heuristic solution methods for Quadratic Assignment Problem, 2010, Shahed University, Tehran, Iran, https://ieeexplore.ieee.org/document/5668262" (Year: 2010).*

"Abdulkarim et al. Comparison of Algorithms for Solving Traveling Salesman Problem, Aug. 2015, IJEAT, https://www.ijeat.org/wp-content/uploads/papers/v4i6/F4173084615.pdf" (Year: 2015).*

S. Lin & B. W. Kernighan, An Effective Heuristic Algorithm for the Traveling-Salesman Problem, Oper. Res. 21, pp. 498-516, INFORMS, (1973).

Keld Helsgaun, An Effective Implementation of the Lin-Kernighan traveling Salesman Heuristic, pp. 1-71, Roskilde University, Roskilde, Denmark (2000).

* cited by examiner

SYSTEMS AND METHODS FOR OPTIMIZING COMPLEX SYSTEMS

BACKGROUND

Optimization is a process of seeking to maximize or minimize some utility function relative to a set of criteria, each criterion often representing a range of values depending on the optimization problem description. Multiple problem solutions may be possible, and once the problem is "solved," a utility function allows comparison of the different "solutions" to determine which is "better" or "best"; that is, the optimal solution. Utility functions may involve scoring based on minimal cost, maximal profit, minimal error, optimal design, and optimal management; the utility function also may account for parameters (elements) whose values vary over time and space. In this specification, these descriptors are used interchangeably as ways to represent maximizing utility.

The well-known Traveling Salesman Problem (TSP), and its more general variant, the Vehicle Routing Problem (VRP), are specific cases of a much larger class of optimization problems that are termed NP-complete, meaning that there is no algorithm that is able to produce the optimum solution in polynomial time. NP-complete problems entail search spaces that experience exponential growth, with the number of possible solutions based on the number of problem inputs and how those inputs are sequenced, scheduled, assigned, or considered. Both the TSP and VRP involve optimizing a route or collection of routes through a number of stops or points, the TSP and VRP having a factorial number of possible route sequences. Because of exponential growth, for optimization problems such as the TSP and VRP, it is impossible to consider all combinations, even with modern computers, except for extremely small search spaces. For example, in the TSP, for five stops, there are 120 possible tours. A TSP with ten stops has approximately 3.6 million possible tours. Fifteen stops result in approximately 1.3 trillion possible tours. Using a "brute force" method to solve the general optimization problem for large numbers of parameters would require every possible tour to be considered, which would require years to compute all the possible tours.

As an alternative to the brute force method of computing every possible solution to a general optimization problem such as the TSP, researchers have tried to generate optimal (or nearly-optimal) solutions to the TSP in manageable time using various heuristic algorithms. One of the best-known heuristic algorithms was created by Lin and Kernighan [1] and was later improved by Helsgaun [2] (these two references are listed at the end of this specification). However, the Lin-Kernighan and Helsgaun approaches were created so as to handle distance alone as the cost, and therefore these approaches take advantage of known distances between points when searching for optimal solutions. This characteristic of the TSP means that the TSP has limited applicability for real-world discrete optimization situations. In particular, for many real-world situations, distance is only one of many factors that must be considered when searching for an optimal solution, and often amongst the many factors, distance can be the least costly factor to consider in terms of model complexity and problem definition. For example, timeliness or resource constraints may be much more important than distance. Many researchers have attempted to apply resource constraints to limit the possible resources and then employ the TSP to optimize distance; however, this approach typically results in sub-optimal solutions.

One algorithmic approach to optimizing any general combinatorial problem involves employing some generally applicable utility function (cost, benefit, or value) and applying the Minimum Insertion Heuristic (MIH)—also known as the "greedy" heuristic—to build a solution element by element. Unfortunately, final solutions derived from use of the MIH process generally are significantly sub-optimal.

To improve on the MIH, techniques have been developed to operate on the final solution directly. One such technique is called the Reinsertion Improvement Heuristic (RIH) (or the Reinsertion Order Heuristic (ROH)). While the RIH algorithm can improve the MIH solution, the solution resulting from the RIH can still be significantly sub-optimal.

In addition to heuristic algorithms such as the MIH and RIH, there are meta-heuristic algorithms that have been developed. These meta-heuristic algorithms use adaptations of random search approaches in conjunction with generalized utility models to search for good solutions. Meta-heuristic approaches such as Simulated Annealing or Genetic Algorithms employ randomization techniques to search for better solutions. These meta-heuristic algorithms do not converge as rapidly as more advanced TSP algorithms, but with the generalized scoring models (utility functions), these meta-heuristic algorithms handle real-world scenarios that consider temporal, locational, functional, and resource constraints. While these meta-heuristic algorithms may accommodate fully-generalized utility functions, that is, utility functions that incorporate different types of constraints, the search process is slow, and even local optimality is rarely guaranteed (local optimal solutions are defined as being better than solutions that are similar in structure but are not necessarily the best overall solution, which is called the global optimal solution).

SUMMARY

A computer-implemented method for optimizing control of a process (a set of discrete decisions) includes a computer receiving a process definition (the utility model) and a collection of elements that need to be arranged in a way that optimizes the utility of the process; initializing the process using a collection of discrete elements (stops, events, work orders, tasks, locations) and producing a solution for the collection by inserting the elements into the solution using the Minimum Insertion Heuristic; modifying the order of the elements to be inserted and continuing the process to produce solutions with better scores; continuing to produce solutions based on improving the order of insertion until the process is determined to show sufficiently little progress, according to a stopping rule whereby the cost or utility of the solutions produced is within some accepted convergence criteria.

A computer-implemented method produces an optimized solution of a control process by searching for and finding an insertion order of elements based on a full utility model of the process (plant model) such that when inserting those elements into the solution using a heuristic like the MIH, the best utility is realized. Elements are inserted into the partial solution in a way that optimizes the impact of that insertion into the partial solution. In other words, the element is inserted at the place where the marginal cost of that single insertion is minimized or equivalently, where the benefit is maximized. The solution begins by inserting an initial element into the solution at the place where said insertion maximizes the marginal utility. Minimizing cost and maximizing utility are used here as being interchangeable. A second element is inserted at the location where it maximizes the marginal utility by inserting it into the partial solution consisting of the first element already inserted. This process continues until all elements that can be inserted are inserted into the resultant solution. The process model may be applied to determining optimal shop appointments, routing and scheduling of mobile workers, warehouse planning, airplane scheduling, machinery inspection, machinery manufacture, allocation of cloud resources, or tasking of sensors for data collection, storage, and/or transmission. The method may include general skill and preference matching, multi-day work plans, bin-packing and container shipments, services appointments, and single and multi-project scheduling.

A system for optimizing a control process includes a programmed computer that executes a series of machine instructions stored in a non-transitory computer-readable storage medium. When the machine instructions are executed, the computer accesses a model of the control process. The process model includes a corresponding utility function. An initial cost and each incremental cost of the process model are determined by execution of the utility function through partial and full solutions. If a potential addition of an item in a specific location of the modeled process would increase the overall cost of the process model, as determined by execution of the utility function, the item is not inserted in that specific location. The method further includes accounting for complexities of the process model in the utility function used to score the cost after each item addition.

A computer-implemented method for optimizing a process, the process including a collection of discrete elements and a utility function, each of the elements requiring one or more resources and imposing one or more constraints on the resources, one or more of the resources comprising one or more preferences, the method, comprising optimizing an initial insertion order of a plurality of elements from the collection of discrete elements into a model of the process, one or more of the plurality of elements, comprising: testing a goodness of the initial insertion order of the plurality of elements into the model through the Minimum Insertion Heuristic, comprising generating and evaluating a preliminary solution to the process, comprising: producing a plurality of partial solutions by inserting each element from the initial insertion order, one element at a time, into the model; evaluating the solution utility function of each of the plurality of partial solutions, comprising repeating the element insertion and solution utility function evaluation until the preliminary solution is achieved, the preliminary solution comprising each element being inserted into the model such that the utility function is maximized by each insertion, continuing testing the goodness of the insertion order through a Reinsertion Improvement Heuristic, comprising removing each element in the initial insertion order, one element at a time, from the preliminary solution built using the Minimum Insertion Heuristic; reinserting a removed element into the model so as to maximize the utility function, comprising moving the removed element to a location in the model is moved to a part of the solution that produces the best marginal maximal utility, comprising retaining moves that improve utility; and rejecting moves that do not improve utility, and repeating the removal, reinsertion, and evaluation until all elements have been tested for removal and reinsertion, and further optimizing the process, comprising replacing the initial insertion order with one or more subsequent potential insertion orders, comprising; for each potential insertion order, repeating the testing by application of the Minimum Insertion Heuristic followed by the Reinsertion Order Heuristic, and corresponding evaluations, and with each best observed insertion order, continuing the process of producing one or more subsequent potential insertion orders until the method reaches a stopping condition.

DESCRIPTION OF THE DRAWINGS

The detailed description refers to following Figures in which like numbers refer to like items, and in which.

DETAILED DESCRIPTION

As disclosed herein, optimizing complex systems involves identifying data inputs, choosing or generating an algorithm for processing the data inputs, and computing an objective function such as a utility cost model. Assuming the optimization problem relates to a real-world application, rather than an academic exercise or pure research operation, a solution may be needed quickly, in terms of either or both computer time and real-world time. Moreover, computing resources may be limited; for example, an organization seeking an optimum problem solution may not have available a super computer or a network of hundreds of parallel processors to generate the solution. The organization may need to generate optimal solutions on a frequent basis. Moreover, the input data may vary from problem to problem. Many other real-world variables may separate what is possible in practice from what is theoretically possible. Modern computers are well suited to solving certain problems, even large problems, because of their processing speed. Nonetheless, such computers remain serial processors (putting aside multiple processor computers for now), and therefore must rely on very fast processing to generate problem solutions. In addition, proper encoding of an algorithm helps ensure fast solutions. However, some problems that grow exponentially with increasing data inputs may be such that it is impossible to compute all possible solutions even with today's fastest computers. These so-called NP-complete problems are therefore considered intractable without some helpful heuristic that can run in polynomial time. Increasing the number of processor cores, or operating many computers in parallel, while possibly allowing a solution to be developed in a shorter time than is possible with a single-processor computer, still cannot provide exhaustive search solutions to large problems within a useful time frame. Furthermore, use of such parallel computing systems itself may not be feasible other than for theoretical purposes—that is, aggregating hundreds of computers to solve a large problem likely is so cost prohibitive as to be infeasible for many commercial or practical purposes.

Figure 1:
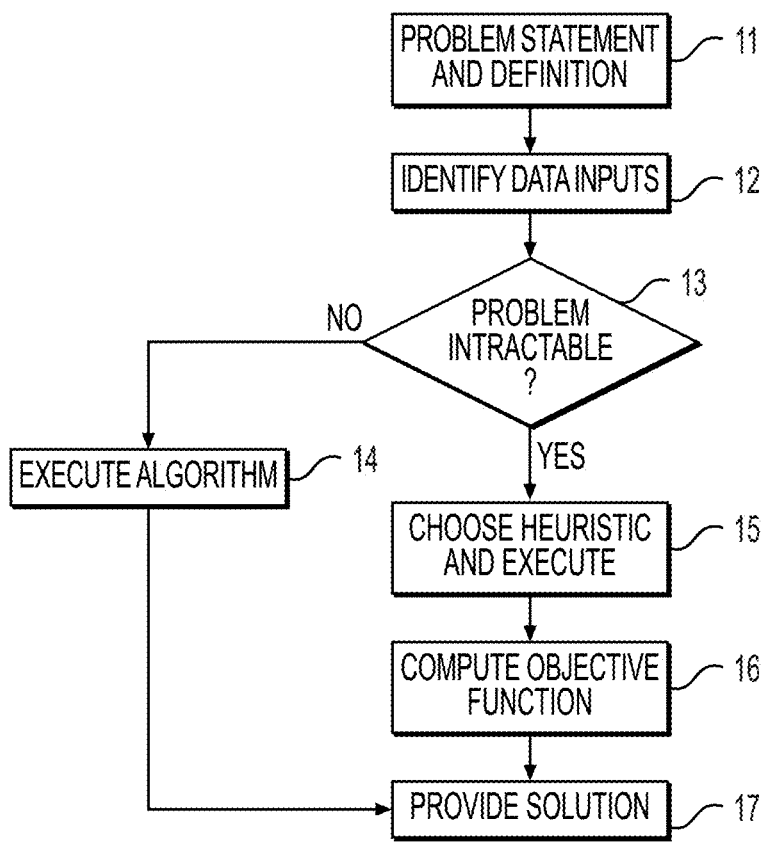
FIG. 1 illustrates aspects of generating an optimum solution for a complex system.

The Minimum Insertion Heuristic (MIH) may be used to find an approximate solution to problems having exponentially increasing search spaces. Applicants discovered a significant insight related to the Minimum Insertion Heuristic, namely that the resulting solutions are dependent on the order in which elements are inserted into the solution, and that if one could rely on the basic MIH alone to produce good solutions quickly, then the complexity and constraints of a general optimization problem may be encapsulated within a corresponding utility cost model. Once the utility cost model is instantiated with the MIH, some TSP approaches may be used to optimize the order in which elements are inserted into the MIH to produce rapid solutions to real-world problems. However, this approach is not straight-forward because, TSP algorithms that rely on known distances between points are not able to be readily adapted to optimizing the solution, but aspects of TSP algorithms that do not need the known distances may be applicable. One does not know the relative importance or even local proximity of having one element next to another element in a solution, and the position of individual elements within a solution also has an impact on the resulting quality of the solution produced by the MIH. Nevertheless, the practitioner may think of the insertion order as a TSP tour to be optimized and use such techniques as genetic algorithms, simulated annealing, or K-Opt moves from Lin-Kernighan [1]. Once this has been accomplished, the best insertion order can be presented to the MIH and RIH algorithms to solve the problem. Even though there are N-factorial possible insertion orders, the simplicity of the MIH means that all the complexity of the problem can be encapsulated in the utility cost model. The insertion orders can be separated into equivalence classes when considering the solution resulting from executing the MIH. In the claimed inventions, as disclosed herein, the class elements are insertion orders and the equivalence is the statement "produces the same solution cost or score through the MIH and follow-on RIH algorithms." Therefore, if the MIH can be relied upon, and if the difficulty of the problem is to determine the optimum insertion order into the MIH, then a whole suite of combinatorial optimization algorithms can be tackled simply by altering the utility function to evaluate the relative utility of solutions. Applicants discovered that even though the combinatorial computational complexity is not reduced by focusing on optimizing the insertion order into the MIH (as it is still combinatorially complex), it does mean that large classes of NP-complete problems can be optimized using this technique FIG. 1 illustrates aspects of generating an optimum solution for a complex system. In FIG. 1, a complex system optimum solution framework 10 includes 11, developing and defining a problem statement; 12, identifying data inputs; 13, determining if the problem, in view of the identified data inputs is intractable; 14, if the problem is not intractable, executing an exact algorithm to generate the optimum solution; 15, if the problem is intractable, choosing or generating an heuristic for processing the data inputs to produce a locally-optimum solution; and 17, based on the solution, computing an objective function using a utility cost model. As disclosed herein, for many complex problems and complex systems, none of these aspects is trivial.

The herein disclosed systems and methods allow practical applications of known heuristics in novel and non-obvious ways to generate solutions to complex combinatorial problems. The description discloses structures and algorithms that provide such solutions. The inventions recited in the claims, and disclosed herein, provide frameworks, systems, and methods for solving complex problems of certain problem classes without the need to resort to unrealistic and commercially infeasible approaches that must remain in the realm of academics, computer research, and processor development. The solutions are disclosed with respect to well-known complex combinatorial problems, and with respect to specific applications (such as an aircraft scheduling application, a warehousing application, a healthcare services application, and other applications, all of which are discussed herein) whose performance could be better optimized through implementation of the structures and algorithms. The structures and algorithms when implemented, improve operations of computer-controlled systems, and further, improve computer execution and use of computer resources. The improvements may pertain to single computer systems, clustered computer systems, and cloud computing systems. The detailed descriptions of the inventions recited in the claims appended hereto refer to certain problems, problem classes, and algorithms, and the embodiments disclosed herein provide significant improvements over current approaches to solving the problems.

Many optimization problems involve choosing or finding an order in which certain actions ought to be taken (e.g., the classic TSP/VRP), but some of these problems also require consideration of the scope of actions that may be taken or required. Accounting for the scope of actions may concern not only the values of continuous variables but also discrete variables, which can take on only integer values, or even logical variables, which are limited to 0 and 1. Application of the herein-disclosed inventive concepts can provide solutions to real-world application. In addition, the inventive concepts also are applicable to solving "intractable problems."

Figure 2:
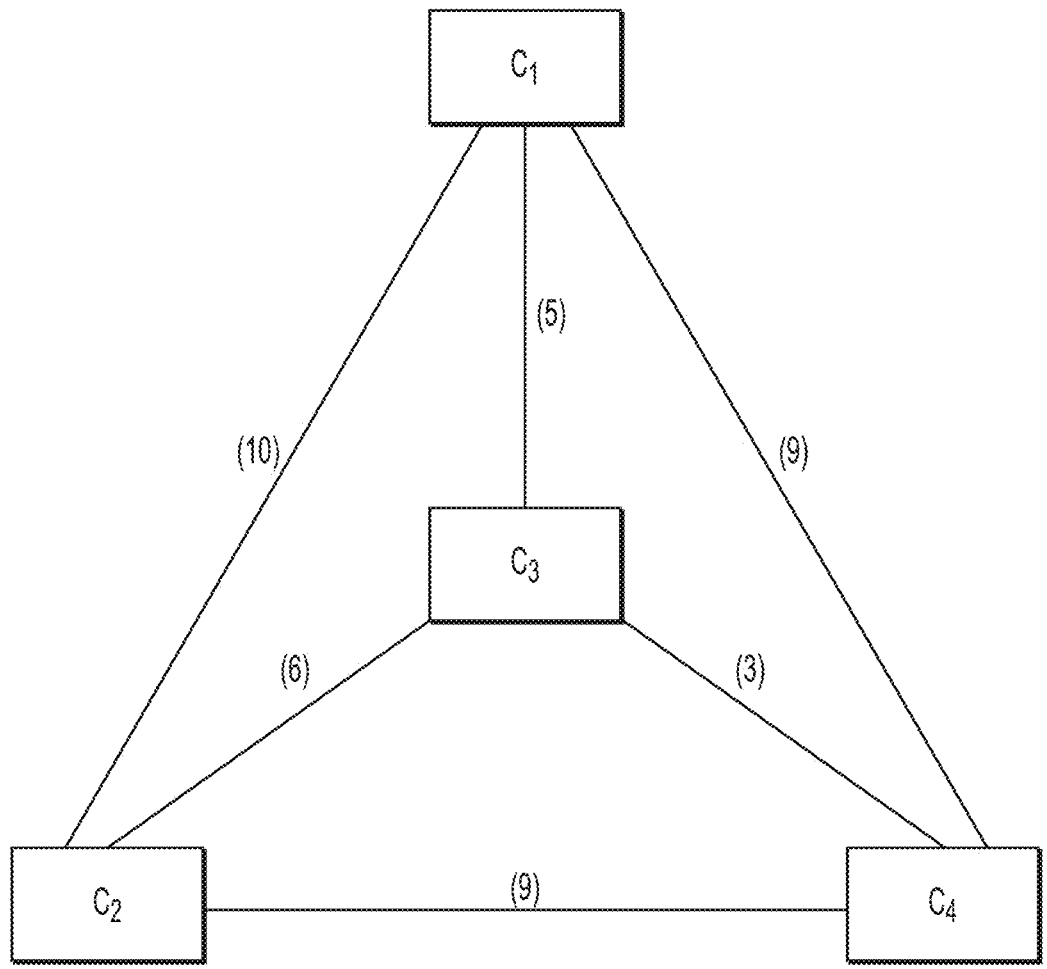
FIG. 2 illustrates an example of a simple traveling salesman problem.

For example, a problem TT poses a question to be answered, and may possess several parameters of variables whose value is left unspecified. The problem TT may be described by giving a general description of all its parameters and a statement of what properties the problem solution is required to satisfy. A problem instance I (of problem TT) is defined by specifying values for all problem parameters. As an example, a TSP may be defined by specifying a finite set of parameters $C=\{c_1, c_2, \ldots c_m\}$, where $c_i$ are cities to be visited (toured) by the traveling salesman. See FIG. 2. Each city pair $c_j, c_l$ is separated by a known distance $d(c_j, c_l)$. A solution to the TSP is an ordering $c_{\pi(1)}, c_{\pi(2)}, \ldots c_{\pi(m)}$ of the cities that minimizes the "length" (sometimes referred to as the "cost") of the tour starting at city $c_{\pi(1)}$, visiting each city in sequence, and returning to city $c_{\pi(1)}$ directly from city $c_{\pi(m)}$ (a variation may end at city $c_{\pi(m)}$). Thus, the data input includes the number of cities and the distances between city pairs. Note that many TSP formulations use distance directly; however, time also may be specified. FIG. 2 illustrates a simple instance 20 of the TSP. As can be seen, the shortest distance is 27 units; thus, an optimization of the TSP instance 20 of FIG. 2 would arrange visits to the cities in an order (for example, starting with city $c_1$) that produces a tour "length" (or cost) of 27—namely cities $c_1$, $c_3$, $c_4$, $c_2$, and back to $c_1$.

The TSP, as with most combinatorial problems, may be solved as an optimization problem or a decision problem. An optimization problem may be a minimization problem or a maximization problem. A decision variant asks if a given algorithmic result is at least no less than or at least greater than some bound B. Both variants are discussed in more detail herein.

An algorithm is a step-by-step procedure for solving a problem. An algorithm may yield an exact solution or an approximate solution. An algorithm executed by a computer is a computer program written in a specific computer program language. An algorithm is said to solve a problem TT if the algorithm can be applied to any instance I of TT and will produce an acceptable solution for that instance I. As one skilled in the art knows, and as discussed elsewhere herein, for a sufficiently large search space, an exhaustive search for the optimal solution of the TSP is not feasible under reasonable circumstances and in a reasonable time. The difficulty: the operating computer must compute all solutions to an exponentially-increasing data input so as to determine which has the lowest cost or length. For a 100-city tour, there are 100! possible solutions, and a single core processor executing one computation per microsecond would require $2.96 \times 10^{144}$ years to compute all possible solutions to in turn identify the optimum solution for the 100-city tour. Clearly, no practical application can wait $2.96 \times 10^{144}$ years to find the optimum solution. Therefore, the TSP problem may be referred to as NP-complete, NP-hard, or intractable. However, some extreme (and commercially impractical) computer configurations involving hundreds of linked computers have been constructed. Other approaches include the work of David Applegate et al., which culminated in development of the Concorde program. The Concorde program embodied an extremely complex algorithm (far beyond the brute force approach). Execution of the Concorde program in 2006 produced an optimal tour for 85,900 data points (in this case, the problem solved involved a microchip layout), but the solution still required 136 years of CPU time. Another approach is described by Keld Helsgaun in a (2000) paper (see reference [2] in a list of references provided herein). This approach involves adaptation of the well-known Lin-Kernighan heuristic (a heuristic is an approximation algorithm). The Lin-Kernighan heuristic is described in "An Effective Heuristic for the Traveling-Salesman Problem," S. Lin and B. W. Kernighan, Operations Research, Vol. 21, No. 2 (March-April 1973), pp 498-516 (see reference [1]). The Helsgaun adaptation provided a solution for the same 85,900-point TSP that was within 0.02% of the optimum found later by Applegate et al. using only a week's worth of CPU. A potential problem with the Helsgaun adaptation of the Lin-Kernighan heuristic as well as the Applegate approach relates to how one determines that the produced solution is in fact the optimal. This problem is inherent in any algorithm, other than exhaustive search. There are ways with the TSP to do this, but these techniques do not readily generalize to any Generalized Utility Optimization (GUO) problem.

Algorithmic efficiency, time requirements, and execution time express complexity. In general, when faced with solving a problem, an algorithm developer will try to produce the most efficient algorithm; that is, the algorithm that produces a solution in the shortest time (which may be measured in computer time) with non-redundant data inputs and non-redundant constraints. The time requirements of an algorithm may be determined by a size of the problem to be solved—the amount (length) n of input data needed to describe the problem instance I. However, other factors may be considered when determining algorithm time requirements. In the TSP example, the size of the problem generally is considered to be the number of cities in the tour. However, an m-city tour includes, in addition to the city labels, a collection of m(m-1) numbers defining the inter-city distances, and the sizes of these numbers also may contribute to the amount of input data. In addition, other factors, or data inputs, such as constrained sequencing may affect the algorithm's time requirements. Algorithmic time complexity, the algorithm's time requirements, may be measured by giving, for each possible data input, the largest amount of time needed by the algorithm to solve a problem instance of that size.

Algorithms may be classified as polynomial time algorithms and exponential time algorithms (either of which may be exact or approximations). The time complexity of an algorithm also may be defined by a simple distinction—that between polynomial time algorithms and exponential time algorithms. A polynomial time algorithm has a time complexity (execution time) of $O(p(n))$ for some polynomial p with maximum order n. An algorithm whose time complexity cannot be expressed as a function of a polynomial p is referred to as an exponential time algorithm. For a modern processor, a polynomial time algorithm of time complexity $n^2$ and n=50 would require about 0.0025 seconds to produce a solution. By way of contrast, an exponential time algorithm with time complexity 2n and n=50 would require 35.7 years to produce a solution.

One perhaps unexpected effect of these time complexity differences is that improvements in computer processing speed have a multiplicative effect on the size of the largest problem instance that may be solved when a polynomial time algorithm is employed, but an almost negligible effect when an exponential time algorithm is employed. For example, a 1000-fold increase in computer processing time increases the problem size (n) solvable in a given time of one hour by a polynomial time algorithm with a $n^3$ time complexity function by a factor of 10, but adds only 6 to the problem size solvable by an exponential time algorithm of time complexity $3^n$. Thus, a problem may be considered intractable if it is so "hard" that no polynomial time algorithm exists that can possibly solve it. Furthermore, the intractability of a problem generally is independent of any scheme for encoding a possible solution and is generally independent of the computer model (model of a computer, e.g., multi-processor) used to execute the algorithm's encoding. Returning to the example of a "hard" problem and a time complexity of $3^n$, with n=60, a "solution" would take $1.3 \times 10^{13}$ centuries, and a thousand-fold increase in processing speed would have a negligible effect on the solution time. This is because computers, being sequential processors experience a polynomial bound on the amount of work (computations) that can be completed in a single unit of time. Parallel processing helps, but cannot overcome the exponential effects of sample space growth so as to transform an exponential-time problem to a polynomial-time problem.

The notion that certain classes of problems exist for which no polynomial time algorithm exists that may solve the problem has challenged researchers for decades. The concept of NP-completeness is intended to apply to a decision problem based on a corresponding optimization problem. The decision problem variant of the traveling salesman optimization problem asks the question, given a numerical bound B, does a structure exist having a cost (tour length) no larger than B? If it can be shown that this decision problem is NP-complete, then the traveling salesman optimization problem is at least as hard to solve as its decision variant. While there is no known polynomial time algorithm that solves the traveling salesman decision problem, it is possible to prove that a claimed polynomial time algorithm does in fact produce an optimal solution. The process would involve first checking that the data inputs actually constitute a tour, then computing tour length, and comparing the computed length to a specified bound B. Such a "checking" algorithm would execute in polynomial time. However, the ability to verify a solution is optimum (or not) does not imply the problem may be solved in polynomial time. This property of the travelling salesman decision problem provides a clue as to getting at a traveling salesman optimization problem. This approach may be termed a non-deterministic algorithm for TSP optimization. This approach could begin with a guessing stage that simply guesses at an arbitrary sequence of city visits and a second checking stage that is identical to the polynomial time proof verifier. For any problem instance I, there will be a guess S that leads the checking stage to respond 'yes' for I and S if and only if there is a tour of the desired length for I (i.e., a length no larger than B). However, polynomial time algorithms merely allow polynomial time verifiability, and may not be a realistic method for solving NP decision problems. Another approach with symmetric TSPs (those where the distance between locations a and b is the same as between b and a for all elements in the TSP) is to use linear programming to compute a bound, B, in polynomial time. Nevertheless, this does not mean that one is able to compute a solution S in polynomial time that will be no larger than B.

An example of a real-world problem solvable using the herein disclosed systems and methods is scheduling airline flights, which not only involves moving aircraft from one airport to another (a vehicle routing problem), but also requires consideration of many other constraints. Assume an airline must set up a weekly schedule of flights. This involves specifying not only the departure and arrival times but the numbers of flights between various destinations (these numbers have to be treated as integer variables). Constraints involve, among other things, the availability of aircraft and crew and are greatly complicated by the need to follow what happens to each individual plane and crew member. A particular plane, having flown from Los Angeles to New York, must next take off from New York, which can only happen under control of a certified pilot, who in the meantime has arrived from Atlanta and has the FAA-mandated amount of rest, among other requirements. Aircraft maintenance requirements are another serious issue along with the working requirements of personnel based in different locations and having to return home at specified intervals. The flight schedule must take into account the passenger demand for various routes and times, and whether they are nonstop. To the important extent that random variables are involved, not only in the demands but in the possibility of mechanical breakdowns, sick crew members and weather delays, various recourses and penalties must be built into the model. The challenge is to find a scheduling solution that optimizes relative to cost or profit considering the difficulties that may arise in formulating mathematically the appropriate objective function as well as delineating and accounting for the constraints.

In preparation for optimizing any discrete complex systems, including the example airline scheduling system, there are two significant questions to answer: (1) How does one model the complexities in the system that are not encapsulated in a distance-only metric? and (2) How does one, based on the utility model for the complex system, search the multi-modal solution space to optimize the results? The answer to the first question is that one can mathematically model the general utility of any configuration of a complex system, but that leaves the practitioner with the need to optimize based on this general utility function where the number of possible solutions is intractable. The second question may be addressed by creating alternate heuristics to attempt to improve the solutions.

A standard algorithmic approach to solving any combinatorial problem is to employ the previously discussed MIH, which builds a solution by placing discrete elements where they provide the highest marginal utility. These elements can be any number of discrete decisions including, but not limited to, inserting tasks into a schedule, stops on a route, or regions within a set of territories. To execute the MIH, one takes the first element and inserts it at the place that results in the maximum increase in utility or profit or minimum decrease in cost. Then the next point in the list is inserted minimally into the partial solution that includes the first point. This process continues until all points are inserted into the solution. However, as noted above the problem with the MIH is that any given solution resulting from the MIH is typically significantly sub-optimal due to the impact of later insertions.

The MIH solution may be improved by applying a Reinsertion Improvement Heuristic (RIH): taking a solution resulting from inserting all points using the MIH and then removing one or more points at a time, and inserting them back into the solution in the places that result in the highest marginal utility. If an improved score is achieved by moving an element to a different position in the solution, then that move is made; otherwise the element reverts back to its original position in the solution. Meta heuristic algorithms such as Simulated Annealing or Genetic Algorithms are designed to allow sub-optimal moves as one progresses toward the goal of achieving a global optimum. In fact, most approaches for providing General Utility Optimization Problems (including the TSP and VRP) are thought to be superior to the MIH even when combined with the follow-on RIH.

As mentioned above, a significant insight related to the Minimum Insertion Heuristic is that the resulting solutions are dependent on the order in which elements are inserted into the solution. One may think of the insertion order as similar to a TSP tour to be optimized, and once this is done, present the best insertion order to the MIH and RIH algorithms to solve the general problem. Even though there may be N-factorial possible insertion orders to present to the MIH, the simplicity of the MIH means that all the complexity of the solution can be encapsulated in the utility function. This allows for a whole suite of combinatorial optimization algorithms to be tackled simply by altering the utility function to evaluate the relative utility of solutions. Even though the combinatorial computational complexity is not reduced by focusing on optimizing the insertion order into the MIH (as it is still combinatorially complex), it does mean that large classes of NP-complete or NP-hard problems can be optimized using this technique.

Therefore, the key deficiency with the MIH algorithms is that the solutions are dependent on the insertion order—the sequence in which the points are inserted into the solution. Moreover, the RIH algorithm is also dependent upon the insertion order from which points are removed from a full solution and inserted back into the solutions so as to provide the highest marginal utility.

To effectively use the MIH to solve a general utility optimization problem, Applicants posed the following question: Does there exist an insertion order for the MIH that will yield the optimum solution for any combinatorial optimization problem? Applicants refer to this question as the Insertion Order Hypothesis (IOH), and in general, this is an unsolved problem. In some conditions, though, it can be shown that the answer to the insertion order hypothesis is in the affirmative, such as in Euclidean geometries for distance-only utility functions, when there exists a point with a location such that when it is removed from the optimal solution the resulting solution to the sub-problem is also optimal. Applicants discovered that this turns out to be a sufficient condition for the Insertion Order Hypothesis to be true for the general utility optimization problem as well. Stated succinctly:

Sufficiency Condition for the Insertion Order Hypothesis: If in any GUO problem with N elements there exists an element such that when it is removed from the optimal solution the remaining solution also is optimal for the GUO sub-problem with that element removed, then there exists an insertion order of the elements to be presented to the MIH such that the produced solution is optimal.

When the Sufficiency Condition is present, Applicants were able to show that the Insertion Order Hypothesis is true. However, even in cases where it is difficult to prove that the Sufficiency Condition holds true, the nature of the Sufficiency Condition suggests that it is an effective assumption, even if it does not hold exactly. Requiring the existence of only one element that is to be removed, for instance, means that there can be a large range of insertion orders in terms of resultant solution quality through the MIH and RIH algorithms.

As mentioned above, one of the best-known solvers of the TSP is the Lin-Kernighan (LK) algorithm (see references [1] and [2]), which utilizes what is referred to as K-Opt moves in an iterative fashion when rearranging potential tours of the TSP. One technique for optimizing the insertion order for an MIH algorithm for a general GUO problem is to apply similar K-Opt moves on the insertion order, as if it were a TSP tour. Some defining differences with the GUO problem is that situations are often asymmetric and the "distances" between any two elements in the insertion order are most likely unknown. In addition, the appearance of an element at the end of an insertion order is likely to have a different effect than that element would at the beginning or the middle of an insertion order. All of these difficulties must be considered when optimizing the insertion order.

Figure 3:
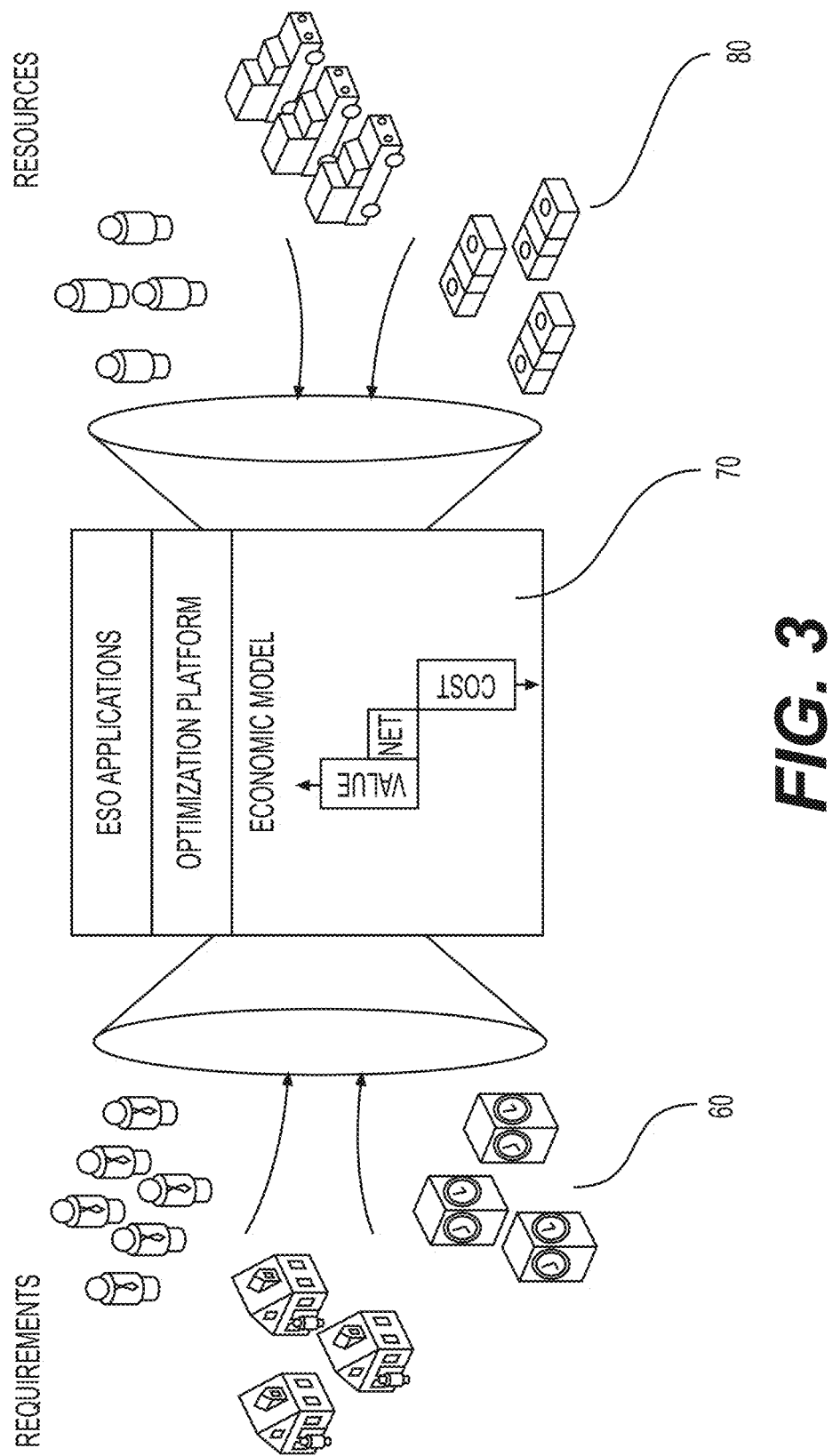
FIG. 3 illustrates an example general utility optimization framework.

Referring to FIG. 3, the General Utility Optimization (GUO) problem that the herein disclosed systems and methods address may be stated as placing elements (including, but not limited to people, parts, skills, tasks, resources, etc.) in the context of a complex discrete system or process. There can be many different systems or processes that can be modeled and thereby the disclosed embodiments can be used to optimize the following situations, to name a few:
Shop appointments
Routing and scheduling of mobile workers/deliveries
Warehouse planning
Airline schedules
Skill matching
Territory planning
Machinery controls
Indefinite or open-ended schedules
Weekly or monthly plans
Bin-packing and container shipments
Services appointments
Project scheduling
Multi-project resource allocation
Dynamic allocation of cloud computing resources
Tasking of sensors or resources to effectively survey a search space As can be seen in FIG. 3, requirements 60 are applied to optimization framework 70. Components of the framework 70 are used to optimally assign resources 80 to satisfy the requirements 60.

The time periods involved for planning can vary and span any number of days, and the task is to determine how best to allocate the elements of a discrete complex system, given restrictions, specifications, capabilities, and constraints. Such problems are presented with combinatorial growth, but the general nature of the objectives means that many tools and techniques that are designed to minimize distance may not be applicable to the more general problem, such as skill requirements, time windows, and bin-packing. In fact, it is possible that simple distance minimization is a low-value component of the GUO problem, and in many applications, distance is not a factor at all in the utility model, such as when customers are to arrive for appointment schedules at a stationary shop, for example. It is often the case in the more general problem that minimizing distance conflicts with other requirements in the model.

A skill or preference is a dichotomous concept, which can either be satisfied or not satisfied. There can be any number of skills, requirements, and preferences of resources that are to be matched to their appropriate requirements. Some skills are referred to as "hard", which means that they must not be violated at any cost, and some are preferences, meaning that they can be violated, but their violation will result in a reduction of the solution's utility. Also, there are operators from which skills and preferences are applied, either AND, OR, or NOR. An AND skill means that if the job has multiple skill designations in that category, then all skills must match. An OR skill means that if any one skill in the category matches, then that skill is satisfied. A NOR skill means that if any one skill in the category matches, then that skill is violated. An example of an AND skill set in a medical setting is proper licenses, such as:
Doctor
Nurse
LPN
RN
General Worker Those licenses can be mapped to a whole set of tasks that are approved, or the tasks can be mapped to skills on a one-to-one basis. Tasks include, but are not limited to:
Prescribe Drugs
Administer shots
Draw Blood A home health company that provides nursing care to patients would need to adhere to various license, skill, and preference requirements. The preference requirements can apply to both the provider and the patient/recipient. There is typically a set of skill categories or skill levels associated with whole classes of tasks/services. When creating schedules for the various resources, from doctors, and nurse practitioners to lab technicians and aids it is imperative to get the right person to the right place at the right time with the right stuff. All of these requirements can be encapsulated in the General Utility Model. It is also worth noting that while there are patient preferences, there can be provider preferences as well. A nurse, for example may not want to be assigned a patient with whom the patient has had a conflict.

An example of an OR skill is the set of tasks that a resource with a particular certification can do. If a person with that certification or skills indicate a proficiency in performing that task, then the requirement is met. Otherwise the requirement is violated.

An example of an NOR skill can be a set of names for the worker matched to the job. The job might have a preference that anybody can be assigned except for Tom, Dick, or Harry. If either Tom, Dick, or Harry are assigned to the job, then the requirement is violated and an associated penalty is incurred. Otherwise the requirement is satisfied.

A resource also can have many restrictions and capabilities. A worker can have a set of attributes including, but not limited to:

Personal: Identification, Licenses, Skills, Preferences, Team Membership
Geographical attributes: Starting location, Lunch location, Ending location
Temporal attributes: Work Schedules, Availability, Overtime limits
Compensation: Wages and Payment structure
Transportation: Specifications of vehicles, Capacity, and Inventory.
Inventory: Real-time inventory for the Vehicle and the Depot
Work rules: Mandatory breaks, Union contracts, Overtime restrictions, Area constraints In addition to workers, machines that may be used in various scenarios may have restrictions and capabilities. For example, as discussed herein, computer-controlled laser drilling of air cooling holes in turbine blades involves multiple laser setups, each setup having specific restrictions on its use and specific capabilities when considering the material used to form the turbine blades.

Each resource must be distinguishable from other resources, and a unique string identifier may be used to provide precision modeling of the complex system. Some workers are more efficient and will work faster than others. These details can be accommodated in the utility cost model. If one worker is twice as efficient as the average worker, for example, then an efficiency factor can be applied to the duration of each job to adjust the expected duration of the work. If no efficiency factor is specified, then the system will assume the average or nominal duration for a particular task or job.

In some routing and scheduling problems, a worker is to travel to provide the service on-site. In such problems, the starting and ending locations can be specified, or it can be specified that the starting location is the ending location from the previous schedule, or it can be specified that the ending location is to remain at the last job location (as in a case where the worker travels to various cities via airplanes, and must travel to multiple cities throughout multiple days).

A worker or resource can have varying availability requirements, and split shifts in a day may be necessary. In addition, there can be break requirements. When breaks are to be inserted into a schedule, rules can be applied, such as:

No break is to be inserted before the first job of a day
No break is to be inserted after the last job of a day
Breaks can be inserted during a job
Break time windows can be specified.

Worker availability can be specified by date or day of week, and special date availabilities can override a general availability specified for the day of week.

A worker can be driving or flying a vehicle with compartment capabilities for delivering or picking up materials at the jobs. For example, a worker may be delivering oxygen to at-home patients. The requirement might be to deliver full oxygen canisters (in a Coke-bottle type truck outfit) and picking up empty canisters left on the porch. It is non-compliant to deliver empty canisters, and the matching system must make sure that there is room on the truck to put empty canisters on after dropping off full ones. In addition, there might be a liquid oxygen tank on the truck for refilling canisters. Therefore, there might be different types of bin-packing requirements, as well as size limitations, and quantities. For example, there might be small, medium, and large boxes that are to be picked up (from a storage and moving company, for example), and the truck can hold so many of each type of container. A General Utility Model should be able to accommodate these requirements.

Therefore, to model bin-packing requirements, it is assumed that the transportation resource assigned to a worker has the capability of handling a plurality of compartment types, a max quantity for each, and a starting quantity for each. The platform will adjust the quantity for each, after the jobs have been matched to the workers. There can also be designated a plurality of warehouse locations that the worker can go to if there is a need to refill the inventory for downstream jobs. The solution will only include trips to the warehouse locations if the situation dictates it as being advisable to maximize the general utility of the solution. The quantities can have real-number designations whereby a negative number would indicate a pick-up, a positive number would indicate a drop-off, and a zero would indicate no bin-packing need for that category. It can be assumed to the system and method that if the start location is a warehouse location, or if the worker travels to a warehouse location, then the correct amount of filling of the compartments is done to service the downstream work before either ending the daily solution or going back to a warehouse location.

A job can have many constraints and requirements. A job can have an identification, a location, an estimated time duration, a value or revenue amount appropriated, calendar and time window restrictions, as well as inventory and skill requirements. There can be any number of jobs. A job must be distinguishable from other jobs, and a unique string identifier is typically used for this purpose and for representation in each optimized solution.

A job can specify certain calendar date and time window restrictions. If no date and time window restrictions are specified, then it can be assumed that the job can be done on any date and at any time when the right worker with the right hard skills and inventory is available to perform the job.

Job availability can be specified in a similar fashion to worker availability, except that breaks usually do not need to be mentioned. In addition, special time window requirements can be specified, along with multiple time windows, for dates or for general availability.

A job can specify delivery requirements, either materials for drop off or pick up, as is the case for bin-packing capabilities specified for workers. Quantities can be real-number designators whereby a negative number would indicate a pick-up, a positive number would indicate a drop-off, and a zero would indicate no bin-packing need for that category. If both a positive and negative quantity is specified, then it can be assumed that the positive quantity items are dropped off first before the negative quantity items are picked up. A job can have multiple compartment types specified, in which case a resource assigned to complete the job must have all the correct compartments on the vehicle assigned to him.

Figure 4:
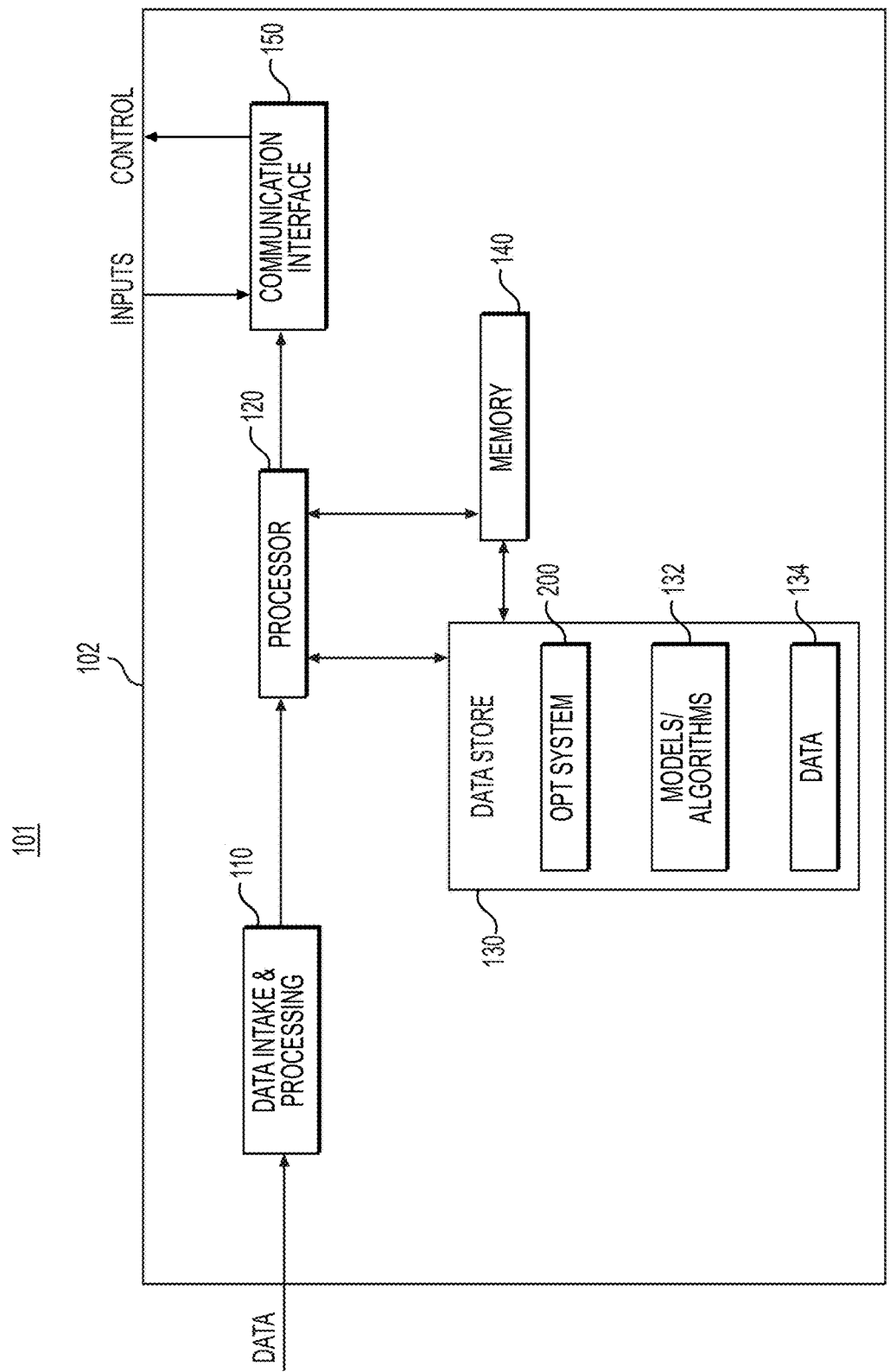
FIG. 4 is a block diagram illustrating an example system for optimizing complex systems that incorporates an example general utility optimization platform.

Other specialty requirements can be specified, such as:
Predecessor/successor jobs
Simultaneous visits
Asynchronous visits FIG. 4 is a block diagram illustrating an example system for optimizing performance of complex systems. In FIG. 4, optimizing system 200 is shown instantiated on platform 101. Platform 101 may be or may include computer system 102. Computer system 102 may be located locally or remotely; or all or part of computer system 102 may be cloud-based. The computer system 102 includes data intake and processing component 110, processor 120, data store 130, memory 140, and communications interface 150. The computer system 102 may communicate over a local wireless network, a wide area wireless network such as the internet, or a combination of networks.

Figure 5A:
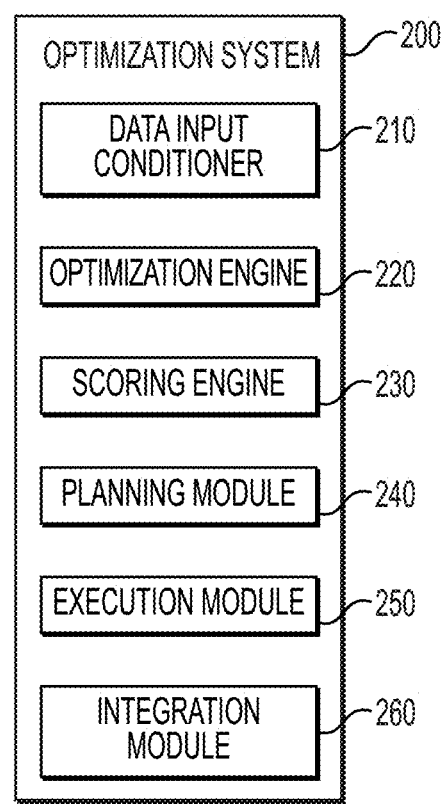
FIGS. 5A and 5B illustrate example components of the example system of FIG. 4.
Figure 5B:
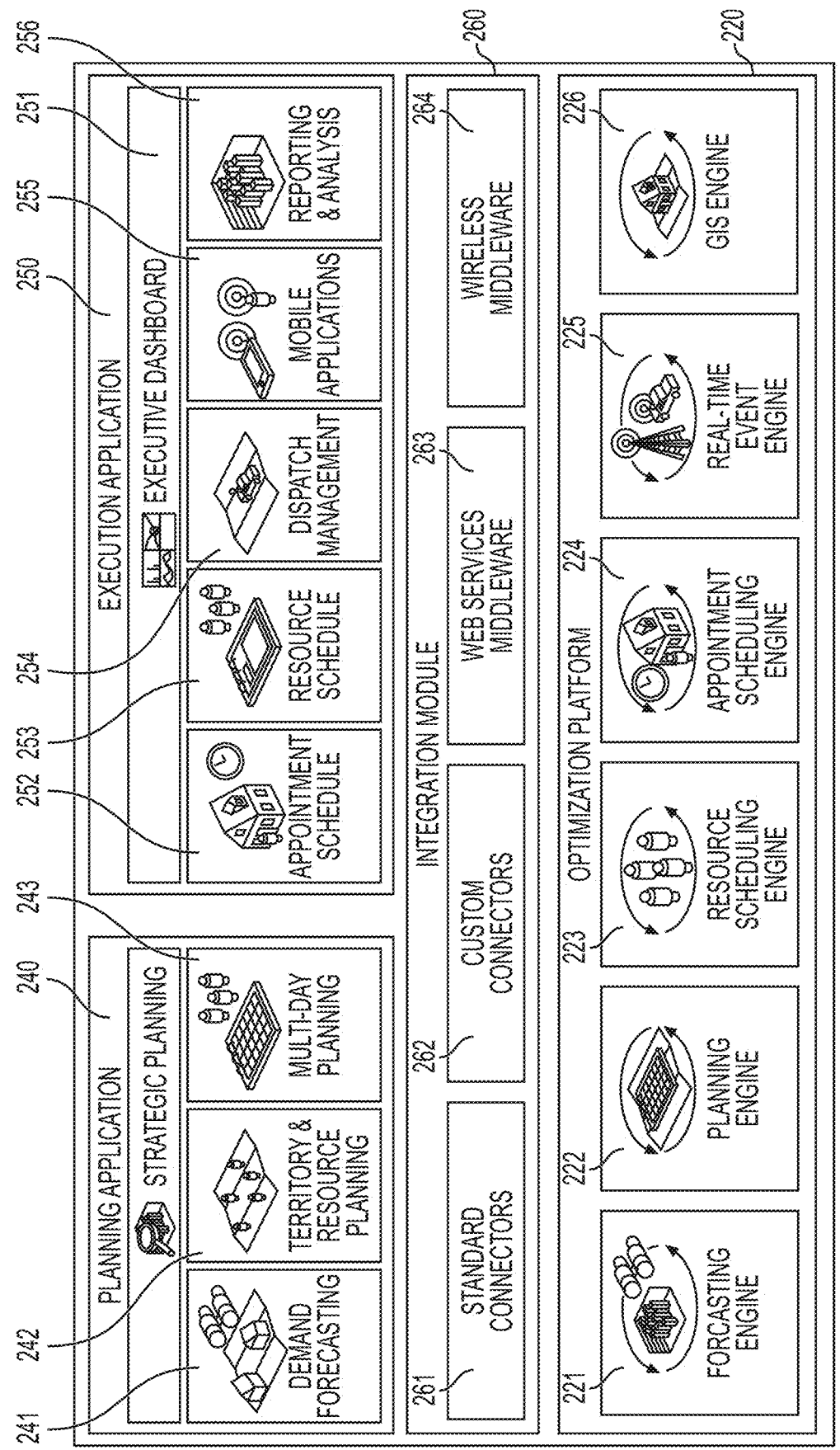

FIGS. 5A and 5B are block diagrams illustrating example components of the example optimizing system of FIG. 4. While the block diagrams illustrate example arrangements of system components, the functions of these example components may be provided by other components, various components may be combined, and various functions may be provided for using other components of the system 200 or other components of the computer system 102. Referring to FIG. 5A, components of the optimization system 200 include data input conditioner 210, optimization engine 220, and scoring engine 230. The system 200 further may include planning module 240, execution module 250, and integration module 260. The data input conditioner 210 receives data used by the other engines and components of the system 200. The received data may include data needed to execute an optimization process as well as a decision process. The data input conditioner 210 may flag redundant data, and verify accuracy of input data.

The optimization engine 220, among other functions, executes one or more algorithms, including heuristic algorithms, to attempt to find an optimum solution to a problem. The heuristic algorithms may be selected from the models/algorithms 132 stored and maintained in data store 130. Which algorithm or algorithms to be used depends on the problem description/definition and may be based on a rule set generated by the operator of the computer system 102.

The scoring engine 230 computes an objective utility function for each of the solutions generated by the optimization engine 220. The scoring engine 230 accounts for many of the complexities present in the problem to be solved.

FIG. 5B is a block diagram showing further details of components of the system 200. The planning application 240 includes demand forecaster 241, territory and resource planner 242, and multi-day planner 243. The execution application 250 includes dashboard 251, appointment scheduler 252, resource scheduler 253, dispatch manager 254, mobile applications sub-module 255, and reports and analysis sub-module 256. The integration module 260 includes standard connectors 261, custom connectors 262, web services middleware 263, and wireless middleware 264.

Also shown in FIG. 5B is a detailed view of an embodiment of the optimization engine 220. In this embodiment, the optimization engine 220 includes forecasting engine 221, planning engine 222, resource scheduling engine 223, scheduling engine 224, real-time event engine 225, and graphic information system (GIS) engine 226.

Figure 5C:
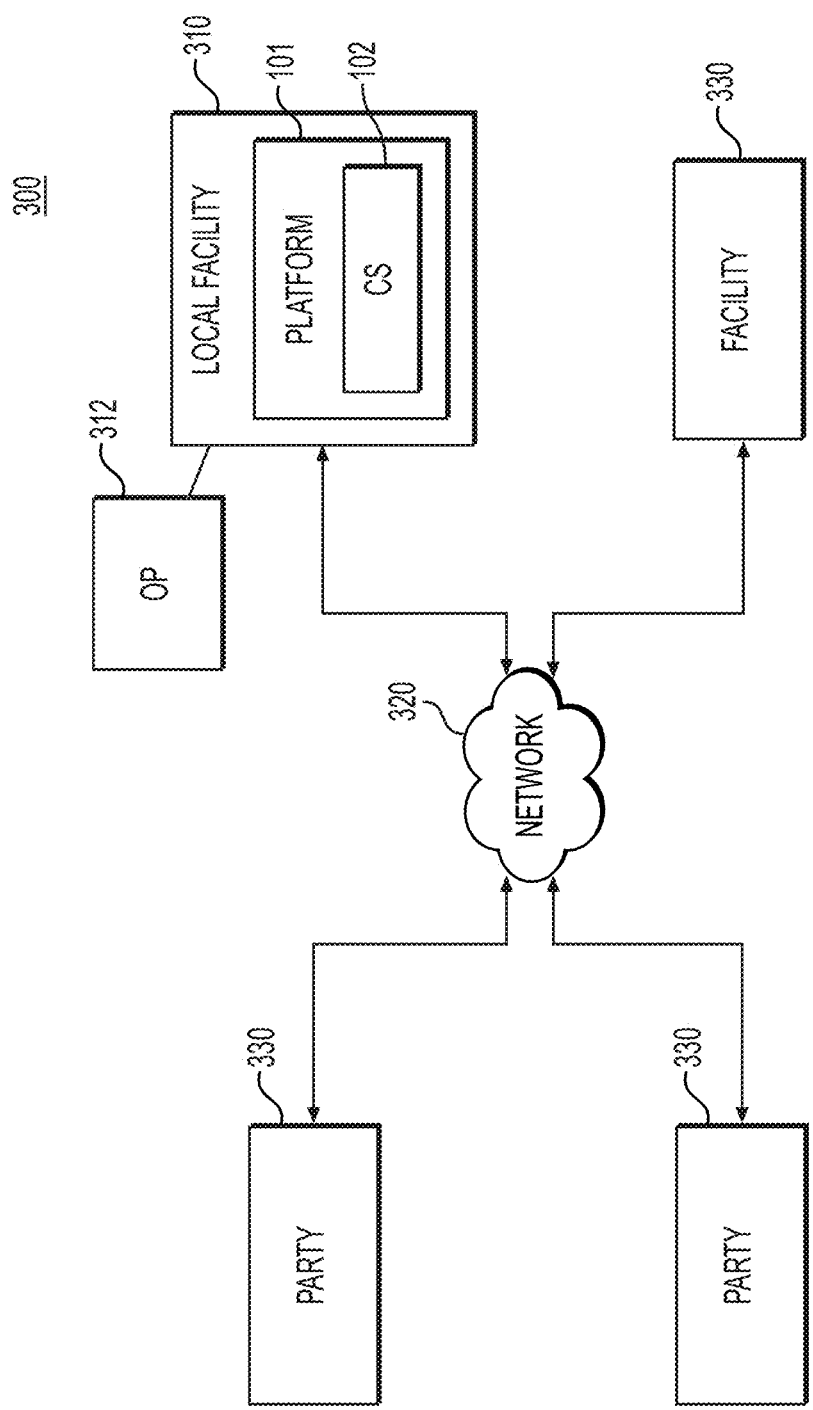
FIG. 5C illustrates an example environment in which the example system of FIG. 4 may operate.

FIG. 5C illustrates an example environment in which the platform 101 is instantiated. In FIG. 5C, example environment 300 includes the platform 101 with computer system 102 located at local facility 310 and in communication, through network 320, with other facilities/entities/parties 330 external to the local facility 310. In an embodiment, the local facility may be a warehouse under control of operator (e.g., a retailer) 312, the parties and facility 330 may be customers who request items from the operator 312 or suppliers/manufacturers who provide items to the retailer. The warehouse may be operated by the operator 312 to distribute items to requesting customers and receive replacement items from the suppliers/manufacturers. In another embodiment, the local facility 310 may be a service facility operated by a service provider. The service provider may provide trained personnel to provide services on an ad hoc basis and/or a recurring basis to individuals and entities requesting those services. As an example, the service provider may provide home nursing services for elderly persons who have specific medical needs. The home care providers may have special training and may be licensed to provide these services. The home care providers may be employees of the service provider, or may be otherwise affiliated with the service provider. In yet another embodiment, the local facility 310 may provide manufacturing, testing, and repair services for critical systems, and may provide service for inspection, maintenance, and repair of aircraft jet engines, oil and gas pipelines and associated operating machinery, bridges, wind turbines, and other critical machinery and systems. In an aspect, an inspection, maintenance, and repair facility may be a department or other organizational structure affiliated with an entity owning and/or operating the machinery to be inspected, maintained, or repaired.

Figure 6:
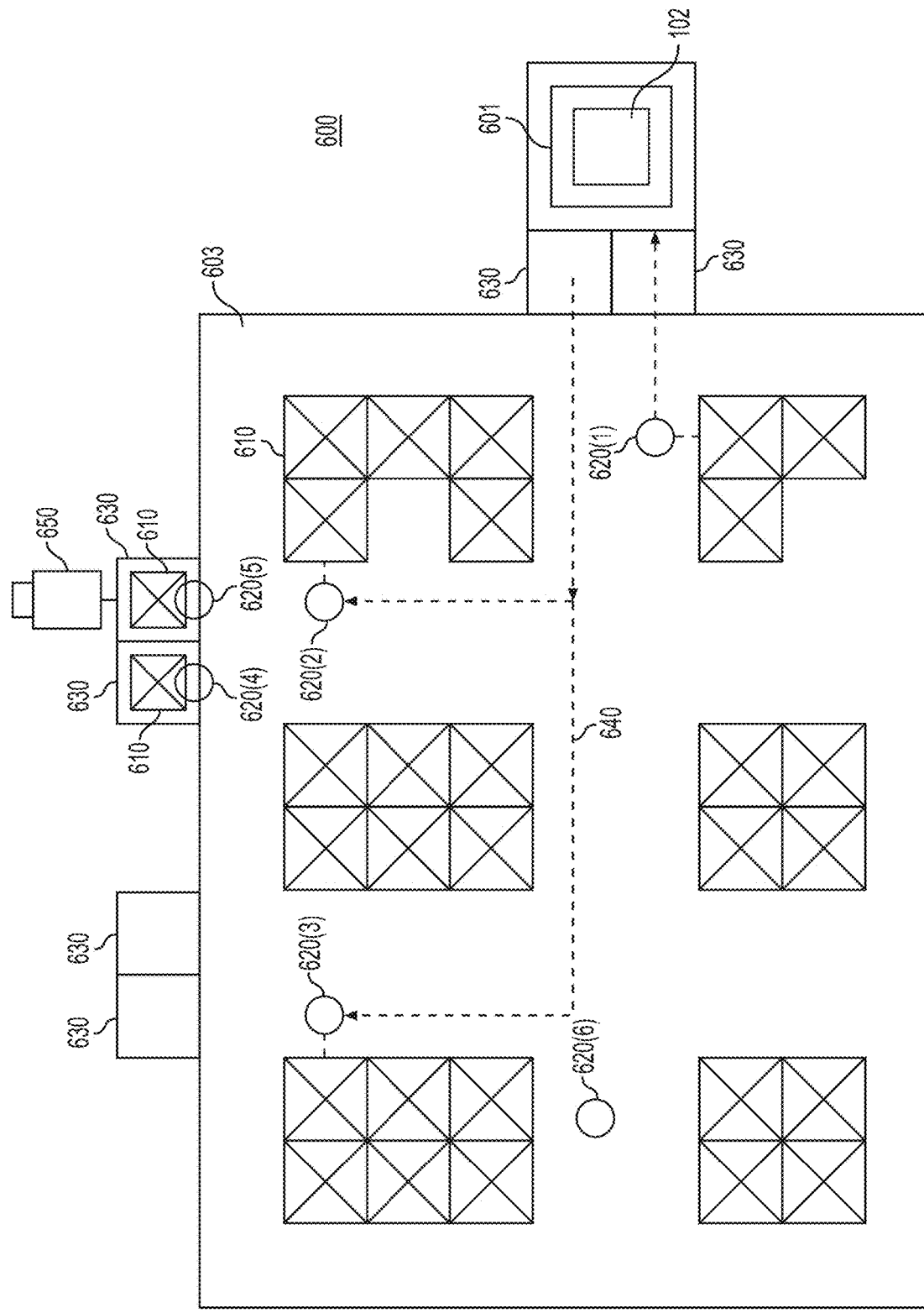
FIG. 6 illustrates an example resource assignment problem solvable using the example system of FIG. 4.

FIG. 6 illustrates aspects of a complex warehousing and inventory control problem whose solution may be optimized in terms not only in terms of a theoretical optimization but also in terms of timeliness and efficiency using the platform, system, and components of FIGS. 4, 5A, and 5B. In FIG. 6, warehouse 600 includes platform 601, which is similar to platform 101, and which includes computer system 102. The computer system 102 is used to control certain aspects of operation of the warehouse 600. Warehouse 600 also includes storage, inventory, and processing area 603. Within the area 603 are storage racks 610, robots 620, and processing centers 630. The robots 620 operate on tracks 640 (only partially shown in FIG. 6) incorporated into a floor 641 that supports the storage racks 610. The tracks 640 allow the robots 610 to move between storage racks 610 and processing centers 630. The robots 610 are in wireless control communication with the computer system 102. The robots 610 are capable of 360-degree rotation, and such rotation is used by the computer system 102 to allow the computer system 102 to direct the robots 620 to make 90-degree-increment changes in direction of travel. The robots 620 are configured to move under the storage racks 610 and then to lift the storage racks 610 and move the storage racks 610 to the processing centers 630, where items (not shown) may be removed from or added to the storage racks 610. After item, removal or addition, the storage racks 610 may be returned by the same or a different robot 620 to their original position or a different position on the floor 641. When not in use/motion, the robots 620 may be parked in locations (not shown) where they will not interfere with movement of other robots 620.

Operation of warehouse 600 differs from other robot-implementing warehouses in that the path that each robot 620 is commanded to take is planned to provide an optimized, or best, overall robot routing plan for a specific time horizon or time window, rather than considering just an optimum routing plan for a specific robot 620. For example, warehouse 600 may receive orders for 900 items to be shipped out (to meet required delivery dates/times) during an 8-hour window and 750 items may be received and stored in the racks 610 during the same 8-hour window. Thus, this example problem is similar in some respects to the TSP; however, several complicating factors, not present in a classical TSP are present in the warehouse example problem, and a solution to the warehouse example problem may be better characterized as a general utility optimization problem that is best solved using a corresponding GUO approach. If only one robot 620 existed in warehouse 600, some aspects of the problem solution might be easier. At least, for example, planning would not have to consider robot collisions or interference. Having all robots 620 at a central location at the start of the time window also might simplify the calculation. However, neither of these two conditions are likely or even feasible. What might be feasible is to have like items stored in the same racks 610 or at least in adjacent racks 610, the overall amount of robot travel may be reduced. However, the items must be assembled at a specific processing center 630, and possibly or at least packaged, labeled, scanned, and loaded into vehicles (e.g., truck 650) for direct delivery to a customer, or for delivery for further transport (e.g., by aircraft). The item identities, destination addresses for each item, need for further delivery, and date/time promised for receipt by an ordering customer may not be known until shortly before the start of the 8-hour window. Were the warehouse 600 operated such that the 8-hour window is planned for orders received in say, a time window ending 48 hours before the start time of the 8-hour window, customers might demand a more time-responsive operation. Other time-critical constraints may mean that the warehouse has little notice in advance of the 8-hour window in which to assemble, prepare, and load the items for delivery. Furthermore, there may be a cost of keeping an extensive inventory in storage at the warehouse 600, and the warehouse operation may not be profitable if that storage time becomes excessive. A still further complication occurs if all like items are in one rack, but the trucks 650 into which the items are to be loaded are parked at different processing centers 630. Finally, in the simple warehouse example, and in the absence of any specific information about item locations, there are 36! possible routes (i.e., possible solutions) to just a travelling salesman problem. As can be appreciated by one skilled in the art, the number of complicating factors in the example operation of warehouse 600 make any solution particularly difficult. The time horizons, bin-packing requirements, and other restrictions and constraints further complicate developing an optimum solution using existing methods. Furthermore, the warehouse operator does not have centuries in which to produce an optimum solution using a current, standard computing system, and likely will not have a massively-parallel computer network that would reduce the solution computation time to years or even decades. Still further, the warehouse operator may wish to optimize robot routing to reduce costs by reducing the number of robots to be purchased and maintained in order to make promised deliveries.

Returning to FIG. 5C, illustrated is a general environment in which the herein disclosed systems and methods may optimize provision of goods and/or services. Specific examples pertain to the health care industry, warehousing and distribution of retail goods, and manufacturing and testing services. An example of an embodiment of this invention is a shop or office that takes appointments from customers. In this example embodiment, the resources are the time slots of availability in the shop or office and the jobs are the customers to be scheduled. In this example, distance is not a concern at all, as it is assumed that customers can arrive by their own means. However, skill matching, availability, and time window restrictions will be important to specify. The utility function may include, as an example a planning scheduler table of assigned customers to time slots and their associated costs.

Figure 7A:
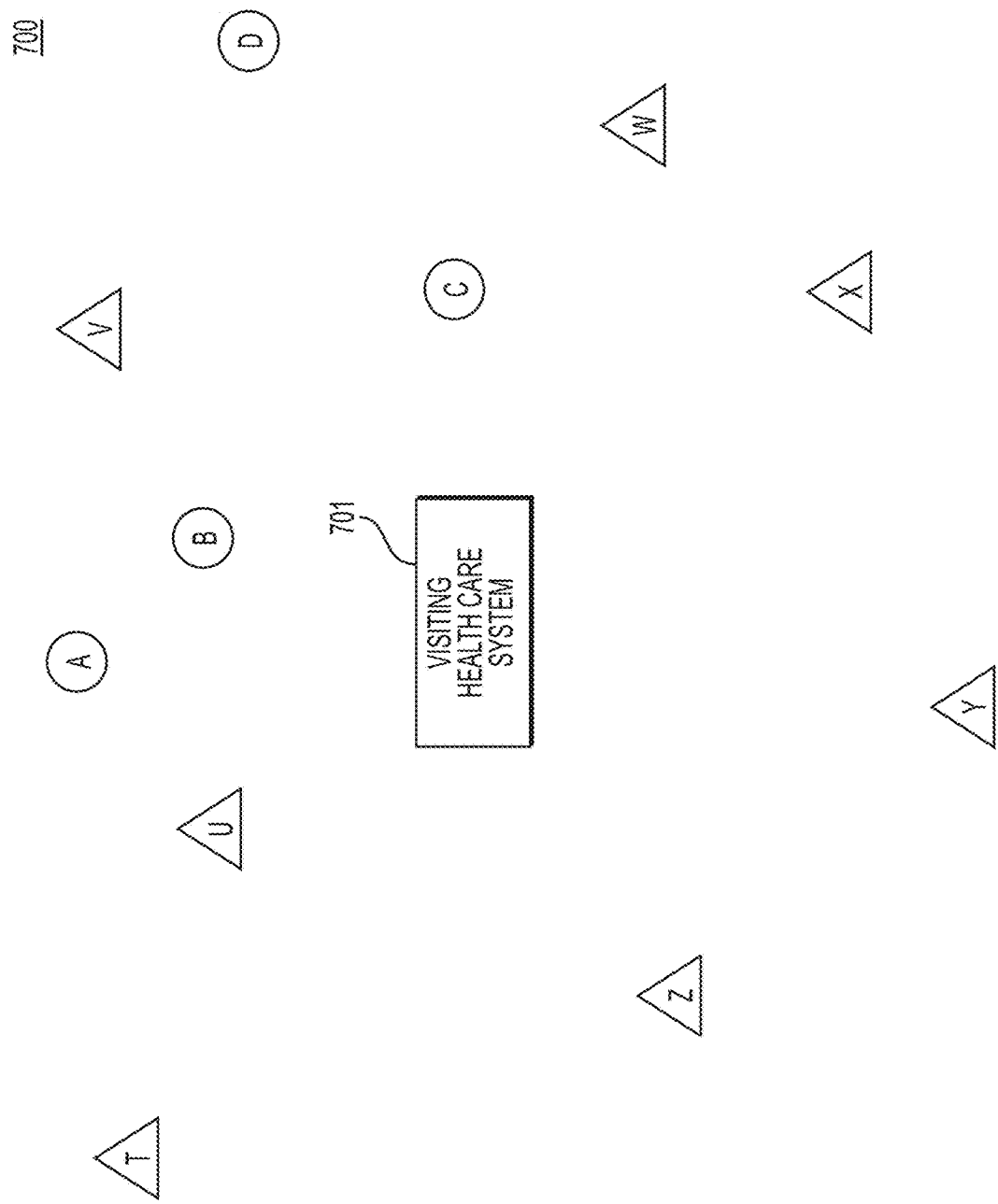
FIG. 7A illustrates another example resource assignment problem solvable using the example system of FIG. 4.

FIG. 7A illustrates aspects of a complex assignment and scheduling problem whose optimum solution may be improved in terms not only of theoretical optimization but also in terms of timeliness and efficiency. This embodiment illustrates routing and scheduling of mobile workers to jobs, either via daily or multi-day scheduling. The factors considered in the General Utility Optimization Problem may include drive distance/drive time, time window compliance, worker availability, customer preference, continuity of care, skill matching, inventory, and compensation. The utility function provides the total cost to deploy the resources including the utility of having a preferred vs. non-preferred resource providing the service.

In FIG. 7A, a local environment is served by visiting health care system 701, which assigns visiting health care workers A-D to visit specific patients or customers T-Z of system 701 on a periodic basis. For example, all patients T-Z may be visited daily, or some patients T-Z may be visited less frequently than others. Furthermore, the time and duration of the visit may vary among the patients T-Z. For example, visit lengths may be scheduled for 2, 4, 6, or 8 hours. The patients T-Z may (but need not) be visited at a same location for each visit (e.g., the patient's home). The system 701 implements the herein disclosed optimizations systems and their associated methods. The problem to be solved by the system 701 may be described as a General Utility Optimization Problem. The objective of the service is to schedule health care workers A-D to visit patients T-Z in a manner that minimizes visit costs, maximizes profit, and complies with restrictions and preferences of both health care workers and patients. As a simple illustration, the below table shows patient requirements (stated as requirements I, II, III, and IV), and matching skills I-IV possessed by the health care workers. As can be seen in the table some health care workers possess multiple skills, and some patients have multiple requirements. Thus, any assignment of health care workers must match requirements to skills; and the assignments should be made in a manner that produces the optimum cost/profit commensurate with the matching. For example, healthcare worker A clearly would be assigned to patient U or V based solely on distance travelled. However, such an assignment would not be made unless the requirements of patient U and V match the skills of health care worker A.

| SKILL/REQUIREMENT MAPPING TABLE | | | |
|---|---|---|---|
| Patient | Requirement | Worker | Skill |
| T | III | A | II, IV |
| U | IV | B | I, IV |
| V | II | C | III, IV |

-continued

SKILL/REQUIREMENT MAPPING TABLE

| Patient | Requirement | Worker | Skill |
|---|---|---|---|
| W | IV | D | I, II, III |
| X | I, II | | |
| Y | II | | |
| Z | III | | |

As can be seen from the table, if all patients are to be visited daily, and if each worker is available daily, then worker D must visit patient X, cannot visit patients U or W, and may visit patients T, V, or Z; at least one of workers A, B, and C must visit patients U and W; worker C may visit patient T; worker B may visit only patients U and W; and worker A may visit patients U, V, and W. With these constraints considered, the optimization system 200 used by the system 701 then may assign workers to patients by, for example, assigning worker A to patient U, worker B to patient W, worker C to patient T, and worker D to patients V, X, Y, and Z. However, these assignments do not account for travel time/distance or required visit time. Thus, assignment of four patients to worker D might result, depending on visit length and travel time, in an invalid solution. In that case, the optimization system 200 would repeat assignments until each patient could be visited by a properly skilled worker within the 8-hour time constraint, or other daily constraint, taking into account travel time. But, that solution, while valid, may not be optimum, and likely is not optimum. Consider that the original assignments produced a valid solution. The optimization system 200 would then execute a number of assignment replacements until an optimum valid solution is produced. Note that the utility function of the optimization system 200 may execute after each optimization permutation until a "best" or optimum solution is produced. The optimization computations may begin by selecting a first worker/patient assignment, and replacing it with a second worker/patient assignment that improves the value produced by the utility function (i.e., further optimizes the assignments through an improved solution). This insertion process continues until no further improvement occurs. However, the system 200 may be configured with a stopping rule so that the process does not run for too long. Alternately, workers may be assigned initially to patients based on the MIH, as disclosed herein, to generate an initial solution. The initial solution generated using the MIH then may be optimized by optimizing the insertion order of the patients T-Z that are presented to the MIH, along with all of their restrictions.

To apply the herein disclosed inventive concepts to a process for assigning healthcare workers to patients, one can consider all the patients T-U-V-W-X-Y-Z that need to be inserted into daily solutions as an insertion order to the MIH and follow-on RIH algorithms. If patient T needs to be visited multiple times over the scheduling period, for example, then that number of jobs needs to be added to the insertion order, such as T1-T2-T3-T4- . . . -TNT, U1, U2, U3, . . . , UNU, V1,V2,V3, . . . , VNV, W1, . . . , WNW, X1, . . . , XNX, Y1, . . . , YNY, Z1, . . . , ZNZ. This insertion order may be open-ended or closed, depending upon the application. To apply the inventive concepts, the example insertion order as described above is optimized so as to produce the best score for a utility function when the utility function is presented to the MIH and RIH algorithms. It is possible that the above example insertion order, that is, planning the jobs for patient T first, and then for U, followed by V, followed by W, X, Y, and Z, will be severely suboptimal. Consequently, the inventive concepts allow for different insertion orders to be attempted while searching for the best solution. One such approach would be to apply K-Opt moves from Lin-Kernighan to rearrange a random insertion order into one that has improved utility score. The Lin-Kernighan approach is to consider all possible K-Opt moves until no further improvement is achieved. This may not be possible to do with the general GUO application as described here, but one can limit the number of moves to 2-Opt, 3-Opt, and possibly 4-Opt, and also limit the possible moves to random locations in the insertion order. Furthermore, from the "Gain" theorem from [1], it is necessary to only consider K-Opt moves with K>2 when there is a gain from a 2-Opt move.

Figure 7B:
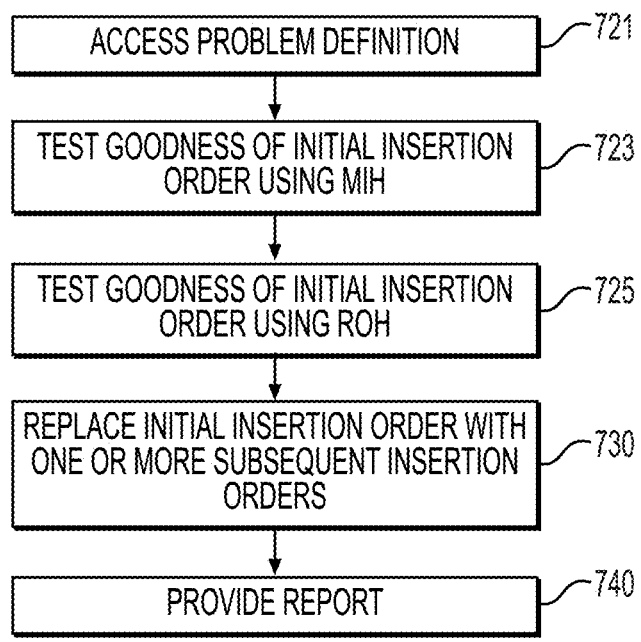
FIG. 7B illustrates an example process optimization method useable for solving the resource assignment problem of FIG. 7A.

FIG. 7B is a flowchart illustrating example method 720 for optimizing a process such as the process of assigning workers to patients. The method 720 may be applied to the scenario illustrated in FIG. 7A in which healthcare workers A-D are assigned to patients T-Z, and which the patients T-Z have constraints as to their healthcare and in which the workers A-D have preferences, constraints, and capabilities. Thus, the method 720 attempts to optimally solve the problem assignment problem; that is optimize a process that involves a collection of discrete elements though execution of certain heuristics such as the MIH and the RIH as scored by a utility function. The method 720 begins in block 721 by accessing a problem definition (i.e., a model of the process of assigning health workers) and an initial insertion order. As noted above, an example insertion order, which for purposes of FIG. 7B will be considered the initial insertion order, is the insertion order T1-T2-T3-T4- . . . -TNT, U1, U2, U3, . . . , UNU, V1,V2,V3, . . . , VNV, W1, . . . , WNW, X1, . . . , XNX, Y1, . . . , YNY, Z1, . . . , ZNZ, as described above. The method 720 then moves to block 723 to test a goodness of the initial insertion order of the plurality of elements into the model through the Minimum Insertion Heuristic. In an aspect, block 723 includes the computer generating and evaluating a preliminary solution to the process, which in turn involves producing a plurality of partial solutions by inserting each element from the initial insertion order, one element at a time, into the model; and then evaluating the utility function for each of the plurality of partial solutions. The method of block 723 is repeated, namely repeating the element insertion and utility function evaluation until the preliminary solution is achieved. In an aspect, the preliminary solution is achieved when each element has been inserted into the model such that the utility function is maximized by each insertion. Note that the utility function may be defined as an action that minimizes cost, and thus the term "the utility function is maximized" means that whether the utility is defined as a maximization or a minimization function is not material. Following block 723, with a solution through the MIH, operation 720 moves to block 725, in which the method 720 continues to test goodness of the initial insertion order through execution of a Reinsertion Order Heuristic.

Execution of the Reinsertion Order Heuristic (ROH) begins by removing each element listed in the initial insertion order, one element at a time, from the preliminary solution built using the Minimum Insertion Heuristic. Such removal is followed by reinserting a removed element into the model so as to maximize the utility function. The reinsertion includes moving the removed element to a location in the model to a part of the solution that produces the best marginal maximal utility. More specifically, the method involves retaining moves that improve the utility function and rejecting moves that do not improve the utility function. The removal, reinsertion, and evaluation are repeated until all elements in the initial insertion order have been tested for removal and reinsertion. The method 720 then moves to block 730, and the computer executes to further optimize the process, by, for example: replacing the initial insertion order with one or more subsequent potential insertion orders. The method of block 730 may include, for each potential insertion order, repeating the testing by application of the Minimum Insertion Heuristic followed by the Reinsertion Order Heuristic, and corresponding evaluations, and with each best observed insertion order, continuing the process of producing one or more subsequent potential insertion orders until the method reaches a stopping condition. Stopping condition may include of one or more of diminished returns of the solution utility function, timed criteria, and reaching a maximum number of iterations through the optimizing methods. Finally, as an aspect of block 730, optimizing the process may include selecting subsequent potential insertion orders, including blind random search, including Monte Carlo search, controlled random search, including a genetic algorithm or simulated annealing, and controlled systematic search, including using K-Opt moves. When a final solution for optimizing the process, the computer-implemented method 720 may move to block 740, and the computer may execute instructions to transform the solution into a human-readable-formatted report and the provide the solution to a human operator or provide a machine-readable report to a follow-on computing system.

Figure 8A:
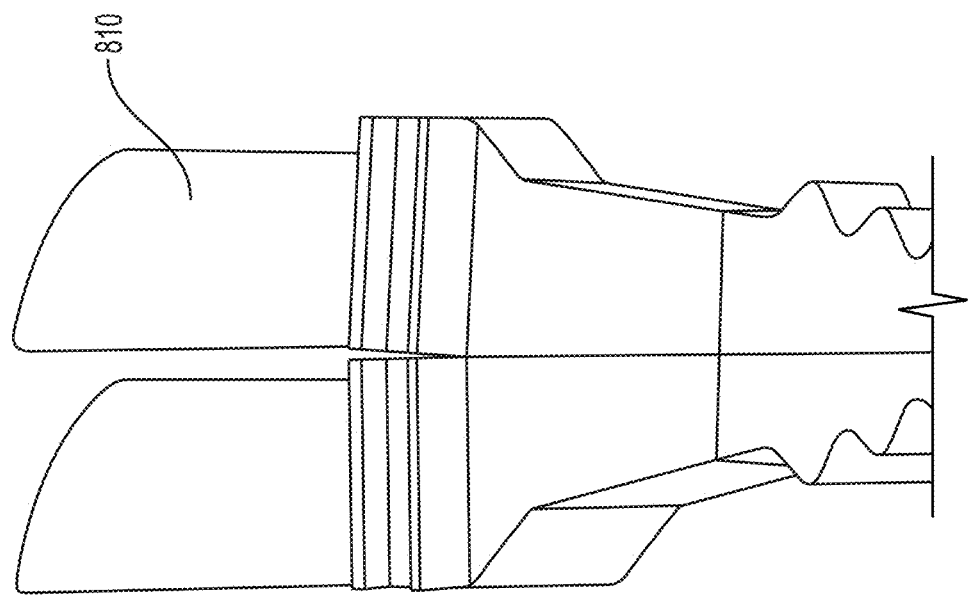
FIGS. 8A-8C illustrate still another resource assignment problem solvable using the example system of FIG. 4.
Figure 8B:
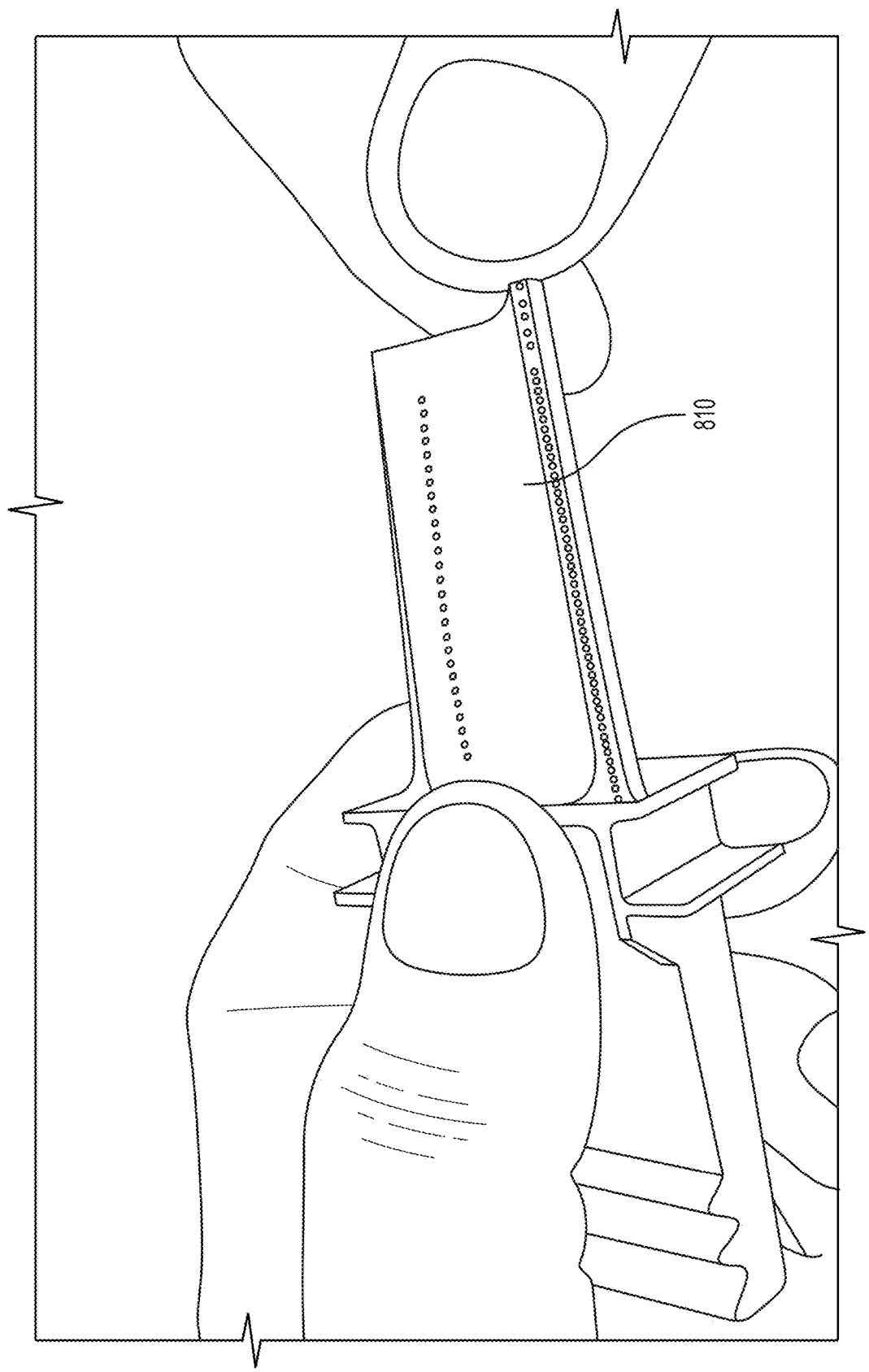
Figure 8C:
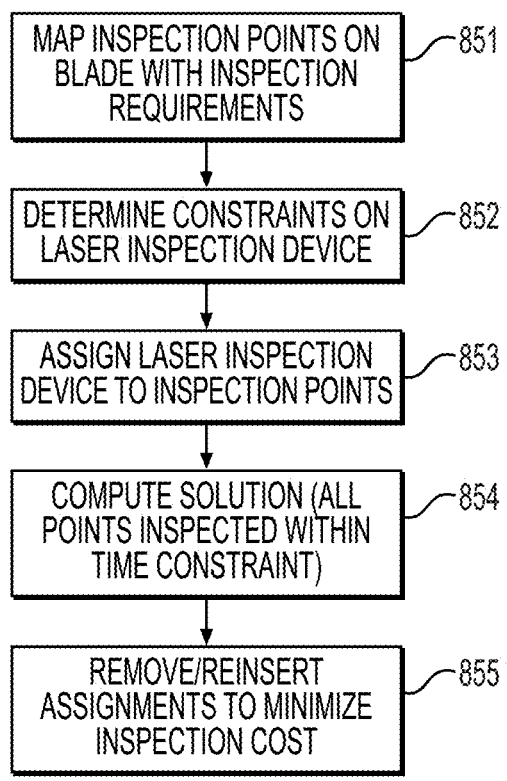

As noted herein, the disclosed systems and methods may be used to optimize problem solutions that involve machinery exclusively, or a combination of machinery and humans. One such scenario involves inspection of high-speed turbine blades used, for example, in jet engines and gas generators. Typically, these blades are subject to visual inspection and some form of non-destructive testing. FIGS. 8A and 8B illustrate inspections of a turbine blade 810 (for example, from a jet engine, although a similar inspection could apply to any high-speed turbine or compressor). FIG. 8C illustrates an embodiment of a blade inspection process that incorporates the herein disclosed systems and methods. The aviation industry requires regular inspections of jet engine compressor and turbine blades to identify defects to prevent engine failure. Turbine and compressor blades are designed to generate maximum power with maximum efficiency at minimum weight and cost, and any shape variation from design can significantly affect efficiency and fuel consumption and, in certain situations, cause blade failure. However, blades are one of the most highly stressed components in a turbine or compressor. Their weight and high-speed applications make them subject to tremendous centrifugal forces. Gas at a temperature of 1,400° C. impinges on the blades at a speed of 100 m/s, forcing the blades to rotate at 50 or 60 revolutions per second (velocity at the tips of the blades is supersonic). Harsh environmental conditions of temperature and pressure after long service hours can result in corrosion, erosion, distortion, and loss of the original component shape and dimensions. Furthermore, turbine engines use fuel contaminated with sulfur, which leads to sulfur corrosion of turbine components. Once sulfur corrosion penetrates a blade's protective layer and reaches the base metal, there is no way to reverse the process. These effects lead to blade deterioration, which may be visible, and which may affect the blade leading edge, thereby affecting chord length. Deterioration also may cause blade thickness variation and blade twist—the variation in twist from root to tip. Consequently, accurate measurements and analysis of airfoil section and root parameters are important during blade inspections, and yet difficult and complicated to achieve. Some blade inspections start with visual inspections carried out by skilled and experienced technicians followed by non-destructive testing such as dye penetrant tests. See FIGS. 8A (showing removed pairs of turbine blades) and 8B (showing a human visual inspection of a removed turbine blade). Besides human visual inspection, other current inspection techniques use mechanical touch probes on coordinate measuring machines (CMM) and mechanical profile gauges for blade inspection. However, mechanical touch probe measurement is slow to complete and the amount of useful data that can be collected using the mechanical touch probe or a gauge is limited because of hardware and measurement software shortcomings. For example, touch-probe-based blade inspection is complicated because of the varying freeform geometries of a blade (which can be seen in FIGS. 8A and 8B). Touch probes and other mechanical devices are slow to use and lack precision. The dynamic range of a mechanical touch probe is zero, making the scanning pattern, alignment routine, and programming of the scan path more complicated. An additional difficulty with touch probe measurement is that of "blade alignment"—finding the exact blade position in space relative to the CMM and moving the coordinate system from the CMM to the blade. The approach typically is based on trial and error efforts in the absence of high precision and expensive mechanical jigs.

Turbine blade inspections could be made more efficient and accurate by using 3-D laser inspection. Using 3-D lasers could overcome the challenges of freeform blade measurement and inspection, while significantly reducing inspection time and providing increased accuracy. Using a small laser spot size allows measurement of very fine geometry details that enables accurate blade section analysis of characteristics such as mean (camber) line, maximum thickness, leading-edge and trailing-edge radii, thickness at offsets from the blade ends, chord lengths (axial, maximal, and parallel), and twist angles. However, even a 3-D laser inspection solution may be excessively time consuming because of the number of points on a curved surface to measure and inspect. Implementing the herein disclosed inventive concepts into a laser-based inspection system could improve blade inspections significantly. Furthermore, certain areas of the blade 810 (see FIG. 8D) are more critical than others and may require more inspections points. For example, the dovetail 811 transmits force on the curved surface 816 to the turbine rotor and thus is subject to higher stress than other areas of the blade 810. In addition, the dovetail 811 is more subject to corrosion than other blade areas, thereby requiring a more comprehensive inspection. In addition, the sharp curves of the dovetail 811 make inspection more difficult than inspection of the surface 816. The leading edge 813 absorbs more punishment than other blade areas but also is thicker. The cooling holes 814 should be free of any clogs. The blade surface may be discolored, but certain discolorations may be more significant than others. A ceramic-coated blade may have different inspection requirements than an uncoated blade. Ideally, the laser inspection device would traverse the mapped inspection points as quickly as possible commensurate with providing a signal indicative of any abnormality that may call into question the integrity of the blade.

FIG. 8C provides a conceptual view of a 3-D laser-based blade inspection framework using the herein disclosed systems and methods. In FIG. 8C, laser inspection framework 850 includes 851 producing a mapping of inspection points on a 3-D computer model of the blade with requirements to be placed on the laser inspection device. The mapping specifies the order of inspection and time on target for each point to be inspected using some starting criteria, such as first inspecting the upper dovetail. Next, the framework 850 determines 852 what, if any constrains exist with the laser inspection device in terms of being able to accurately inspect the mapped locations. For example, the laser inspection device may not be capable of orientation in such a manner as to correctly inspect portions of the sharply-curved dovetail. In an embodiment, any such constraints could lead to removal of the affected points from the inspection mapping. The framework 850 then assigns 853 the inspection device to inspect remaining mapped points according to the assigned inspection order. The framework 850 then computes 854 a solution using the assigned points in the order. The solution may be expressed in terms of expected inspection time. Note that the operator may assign a bound (e.g., upper) for this time, and thus any computed solution that meets this bound would be considered acceptable or valid. The framework 850 then implements 855 a series of removals/replacements of the inspection points in terms of their time order so as to produce a more optimum inspection order. For example, inspections of the dovetail 811 and the leading edge 813 may require more time to focus the laser inspection device than would inspections of a flatter surface of the blade 810. Sharply curved surfaces require more points than flatter surfaces. Thus, depending on blade shape, positioning the laser inspection device may be a time-consuming process. A more optimum ordering of the inspection points might include moving the laser inspection device in a pattern that takes advantage of the blade topography. For example, moving the laser beam laterally along the peaks and valleys of the dovetail 811 may produce a faster scan than moving the laser up and down the peaks without affecting imaging quality. Once an optimum solution is found, the laser control computer may be programmed with the optimum inspection sequence.

Figure 8D:
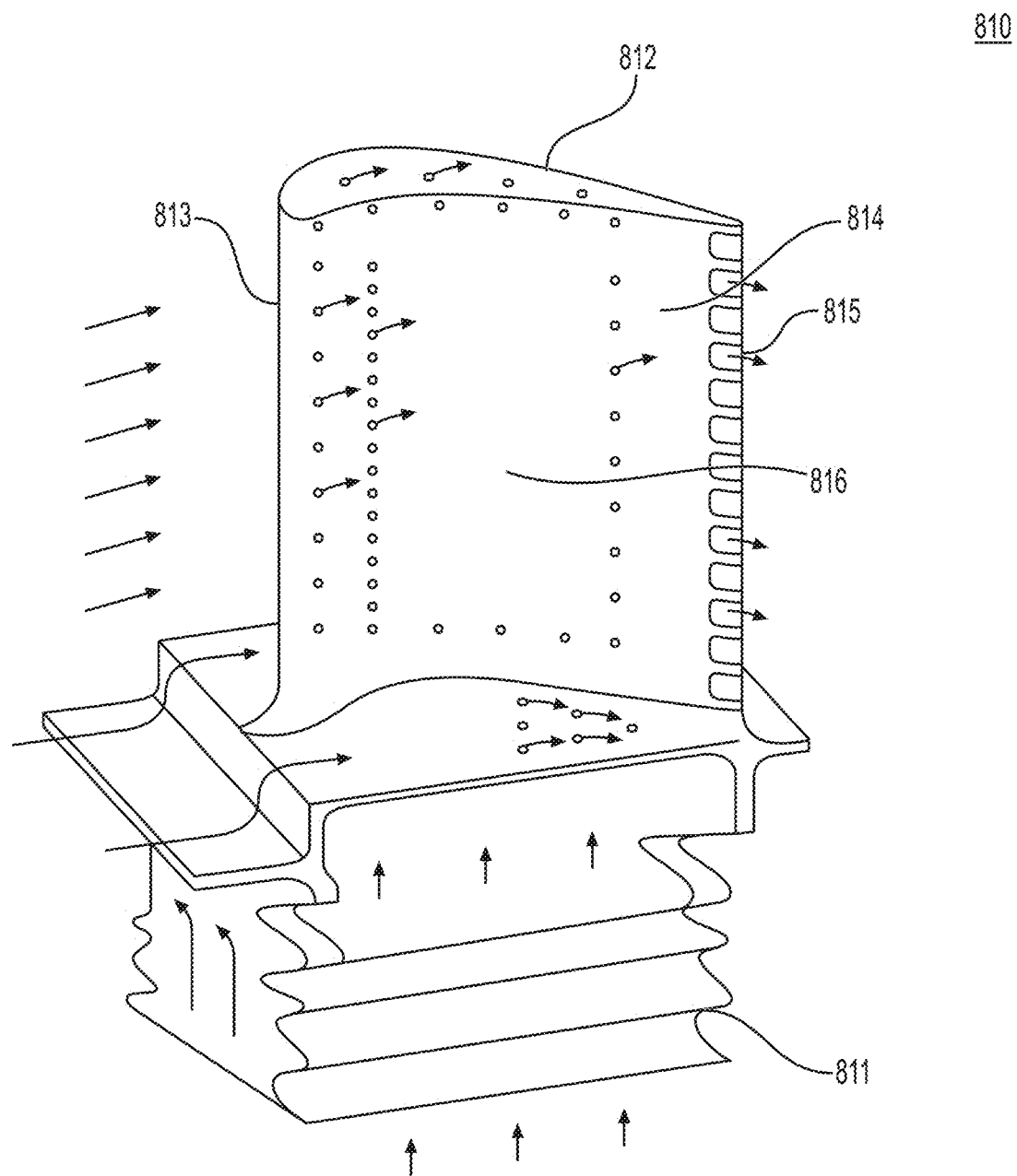
FIGS. 8D-8I illustrate yet another resource assignment problem solvable using the example system of FIG. 4.

Returning to FIG. 8B, the illustrated turbine blade can be seen to comprise a number of holes. FIG. 8D also shows these cooling holes. The cooling holes allow passage of cooling air through the blade 810 (turbine blades typically are hollow and cooling air may be "pumped" into the blade cavity. Some holes are drilled along the length of the blade, and cooling air enters at the blade root (dovetail or "fir tree") 811. Some cooling air transits the length of the blade 810 and exits through tip cap cooling holes 812. Cooling air also may be directed to leading-edge holes 813 and surface holes 814. Other cooling air exits trailing edge holes 815. Cooling air exiting the leading-edge holes and the surface holes 814 allows film cooling of surface 816 of the blade 810. As can be appreciated, the cooling air holes are quite small. As can be appreciated further, the holes must be drilled with great precision to ensure cooling air is supplied to the blade 810 as intended. U.S. Pat. No. 5,306,401 discloses a Shaped Tube Electrochemical Machining (STEM) drilling process for drilling such cooling holes. More recently, lasers have been adapted to drill cooling holes. Current processes for laser drilling air cooling holes in a series of turbine blades may be optimized by incorporating the herein disclosed systems and methods in to the drilling laser controller.

Figure 8E:
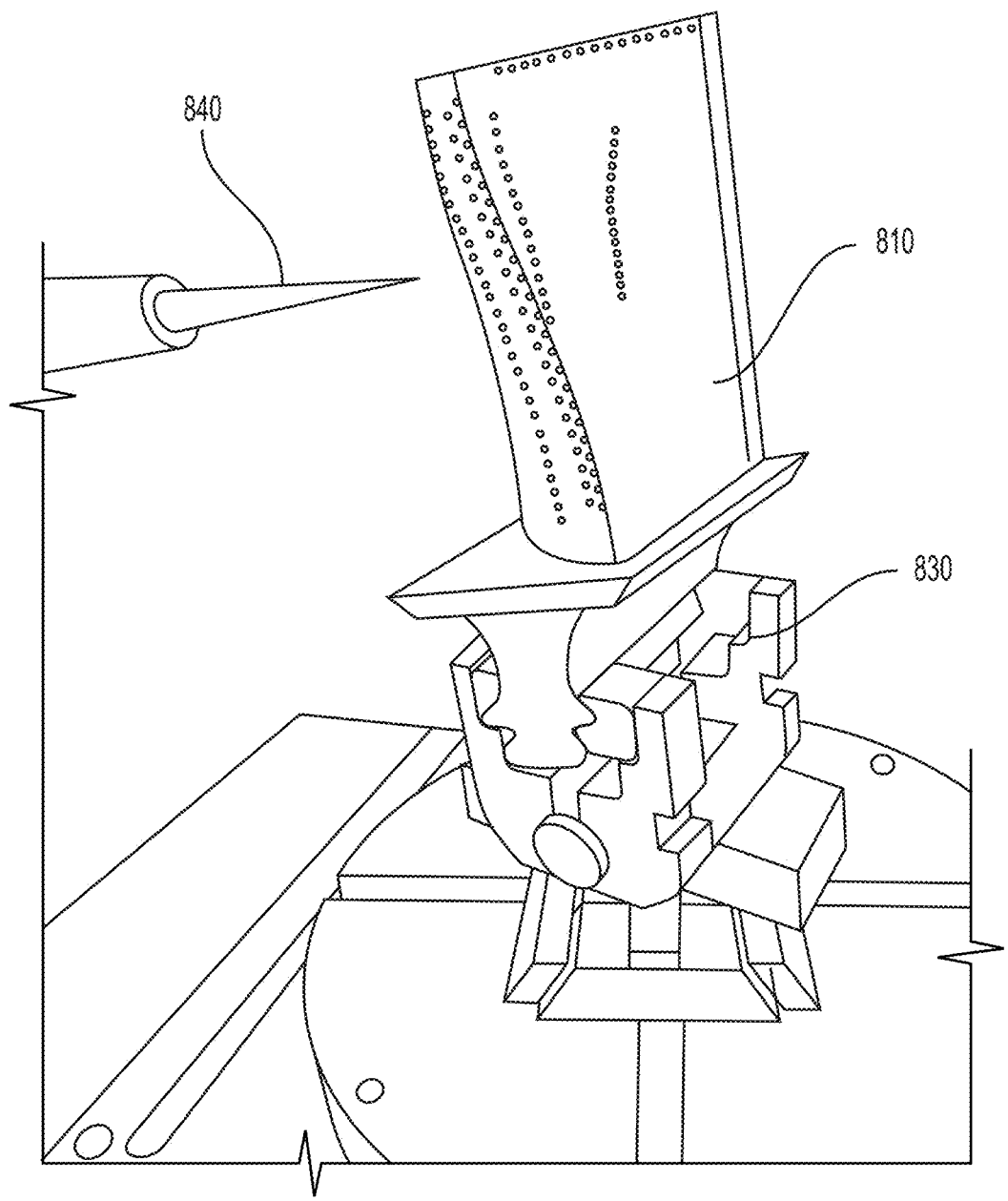

FIGS. 8E-8I illustrate an adaptation of a system for laser drilling of air cooling holes in a turbine blade, such as blade 810. In FIG. 8E, turbine blade 810 is held in a jig 830 while computer-controlled laser 840 (only the tip of which is visible) "drills" the designed cooling holes. The jig 830 (or, alternately, the laser tip) moves to accommodate the complex 3-D geometry of the blade 810.

Laser drilling has the potential to improve gas turbine production. More particularly, a combination of laser systems with different pulse durations and different drilling processes may be used for drilling varying-shaped cooling holes in the complex 3D geometries of typical turbine blades (FIG. 8D illustrates the complexity of such 3-D laser drilling).

Figure 8F:
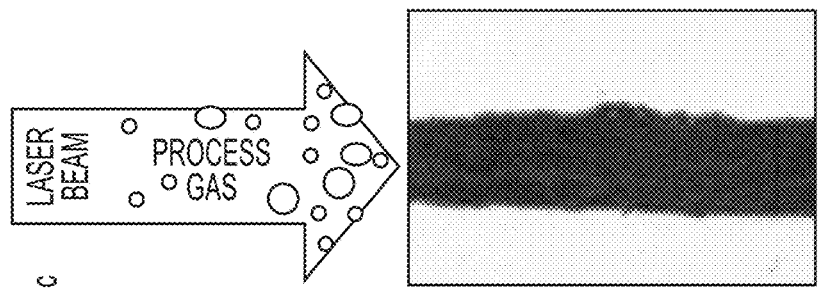
Figure 8F:
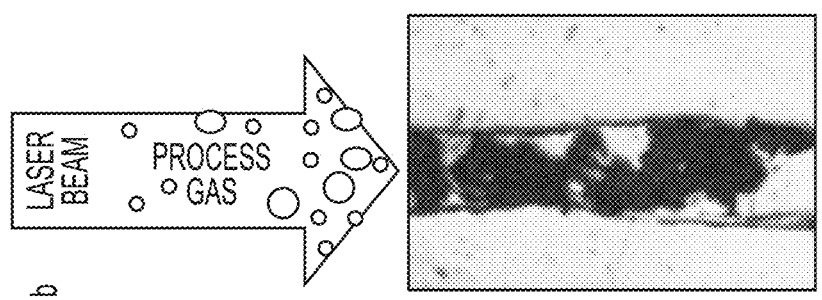
Figure 8F:
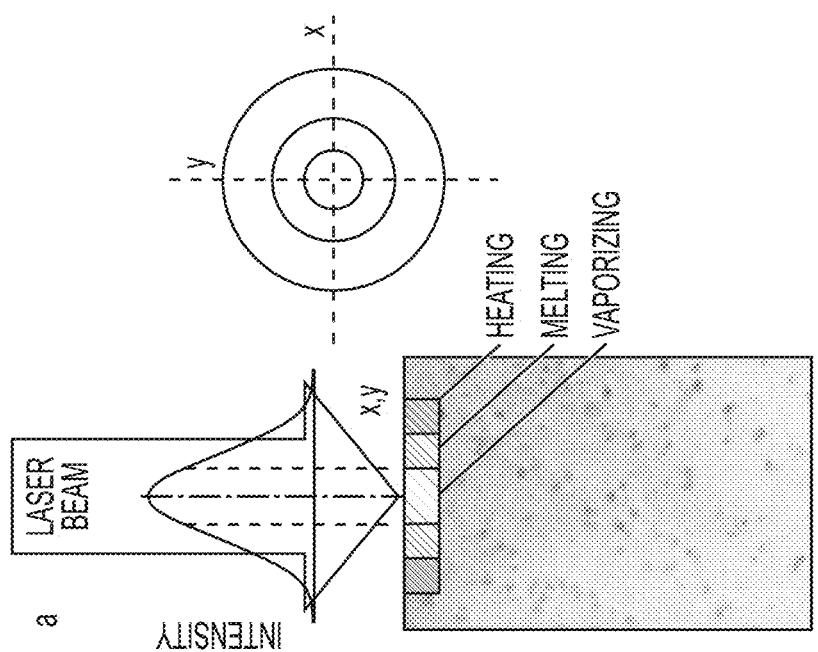

A jet engine turbine or a gas generator turbine may have hundreds or thousands of blades. In extreme operating conditions, the blades may be effectively cooled using an appropriate, well-designed and executed cooling hole implementation that optimizes cooling air distribution. The optimization of air distribution is made possible because lasers are able to drill small (typical diameters of 0.4-1.2 mm) cylindrical holes at varying angles into the curved blade surfaces. Laser systems are able to produce deep penetration drillings (up to 25 mm) by using laser pulse durations in the millisecond range. The cooling holes may be further, and individually, shaped and optimized based on their locations on the 3-D geometry of the blade by varying the drilling processes. For example, varying combinations of pulse durations can produce varying-sized and shaped holes in turbine blades. Many blades may be covered with various metallic and ceramic coatings to help shield the blades from thermal stress and from high temperature corrosion; all of these layers as well as the base material have different physical properties, which adds to the complexity of the cooling hole drilling process. Certain forms of laser drilling can be used to drill such coated turbine blades. Fundamental to the improvements made possible by 3-D laser drilling is the effect process parameters have on both hole quality and drilling speed. Laser drilling makes it possible to machine both very small and precise holes in various shapes and orientations in a wide range of materials. These holes can be tapered or shaped to enhance the amount and direction of air flowing through them, thus improving the blade's cooling characteristics. Hundreds or thousands of cooling holes can be drilled in one blade with a single drilling setup (see FIG. 8E). Laser drilling of cylindrical holes in turbine blades generally occurs through melting and vaporization of the material due to absorption of energy from a focused laser beam (see FIG. 8F). For laser drilling, pulsed laser systems are used, with pulse durations depending on the hole characteristics—for turbine blade drilling typically in the millisecond regime. the pulse energy required is fundamentally determined by the material thickness, composition, and the desired hole diameter. Higher pulse energies provide faster drilling rates but can also decrease hole quality. However, power may be limited by the duty cycle at which a laser can operate without performance degradation. Laser drilling of turbine blades is accomplished using average powers of about 200-400 W. The pulse length, typically ranging from 0.5 to 2 milliseconds, is chosen to optimize the hole quality. A laser beam penetrates only a few hundred nanometers into metal. The process transferring energy deep into the material is heat conductivity, causing an energy transport in the direction of the laser beam. Depending on the intensity, different kinds of processes occur; for metals, vaporization takes place above 107 $W/cm^2$, melting at about 106 $W/cm^2$, and below 105 $W/cm^2$ only heating occurs. Whether melting or vaporization is more dominant in a laser drilling process depends on many factors, with laser pulse duration and energy playing important factors. Typically, Gaussian shaped pulse intensity distributions are applied, causing vaporization in the hole center and melting in a surrounding layer, as shown in FIG. 8F, process a. To remove material by melting requires only about 10-20% of the energy needed to vaporize the same volume, because of the 10 times higher specific vaporization energy compared to the melting energy. When certain lasers are used (e.g., a flash-lamp pumped Nd:YAG laser), most material removal is though melting (although vaporization also occurs), and the process creating a hole is referred to as melt expulsion, which is a result of a rapid build-up of gas pressure within a growing bore cavity. A molten layer forms and when the pressure gradients acting on the surface due to vaporization are large enough to overcome surface tension forces, the molten material is expelled from the hole. In the beginning of the process the discharge of molten material occurs only on the side where the laser beam enters the work piece. and the melt moves along the bore wall toward the entrance hole. FIG. 8F, process a, shows this situation where the center of the surface vaporizes, an outer band melts, and a further out band is heated. This process a creates a recast (zone of re-solidified melt). Additionally, small re-solidified particles may remain in the bore hole. After breakthrough, additional pulses may be used to clean the hole of recast material and re-solidified particles. After re-melting, these particles escape assisted by shielding gas pressure through the exit hole. A complex internal protection system is used in the blade cavity to prevent pollution of the blade internals and to prevent the laser beam striking the rear cavity wall. FIG. 8F, process b, shows a partially drill bore with recast material and re-solidified particles. Process c of FIG. 8F shows bore cleanout using additional laser pulses.

Figure 8G:
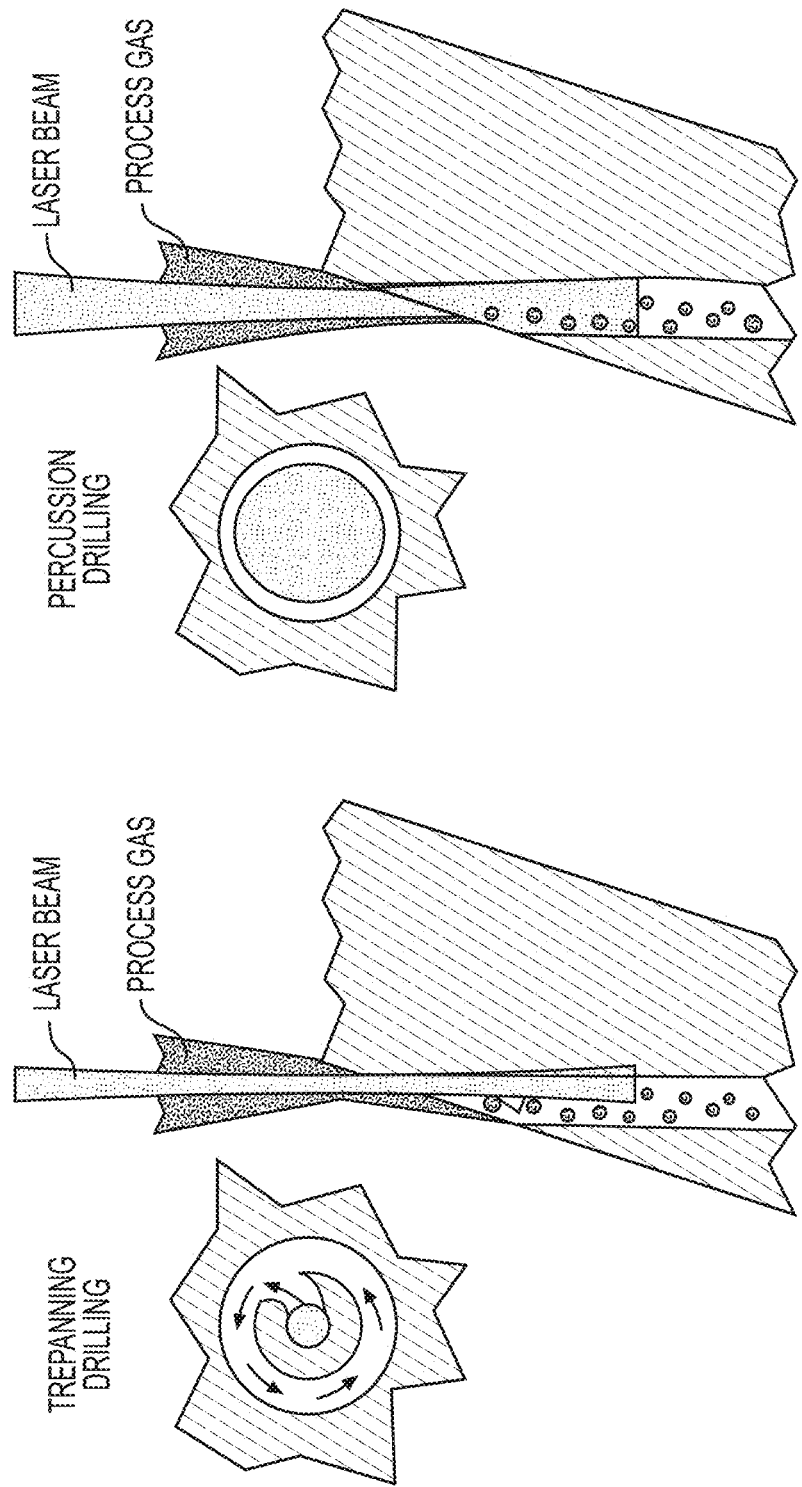

Industrial laser drilling techniques include single-pulse drilling, percussion drilling, trepanning, and helical drilling. Another form of laser drilling is by ablation. FIG. 8G illustrates percussion drilling and trepanning. Percussion drilling, depending on blade materials, may be used for holes with diameters ranging from 0.5 to 0.7 mm and aspect ratios (diameter divided by hole depth) as high as 1:20. Here, the laser spot is stationary at the same position on the surface to be drilled. Depending on the desired results, the optimal focal position can be above, below, or right on the surface. In FIG. 8G, the optical focal point is shown above the surface to be drilled. However, the best setting will usually be determined empirically by evaluating the hole quality—influenced by roundness, taper, recast generation, and the distribution of micro-cracks. Usually the laser optics focus lies within 5-15% of the metal thickness below the blade surface. During the percussion drilling, a process gas protects the laser optics. Together with the laser beam, the process gas also clears the hole after breakthrough. When the laser beam diameter is smaller than the desired hole diameter, a trepanning process, also shown in FIG. 8G, may be used. Trepanning is similar to laser cutting; only the initial hole in the middle of the bore is produced by drilling, and after breakthrough, the laser beam is led by a rotating optics unit, which cuts out the final hole diameter. Trepanning does not depend on the focal diameter, allowing for easy adjustment of the process to cut other hole geometries. Trepanning also provides a high reproducibility of hole shapes. However, trepanning drilling is more time-consuming and delivers more heat into the internal cavity of the blades.

Figure 8H:
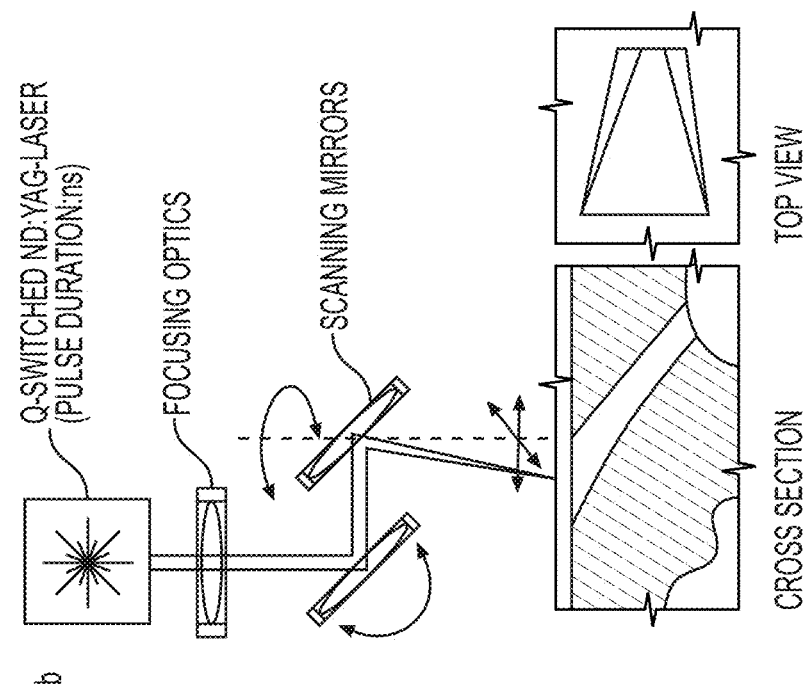
Figure 8H:
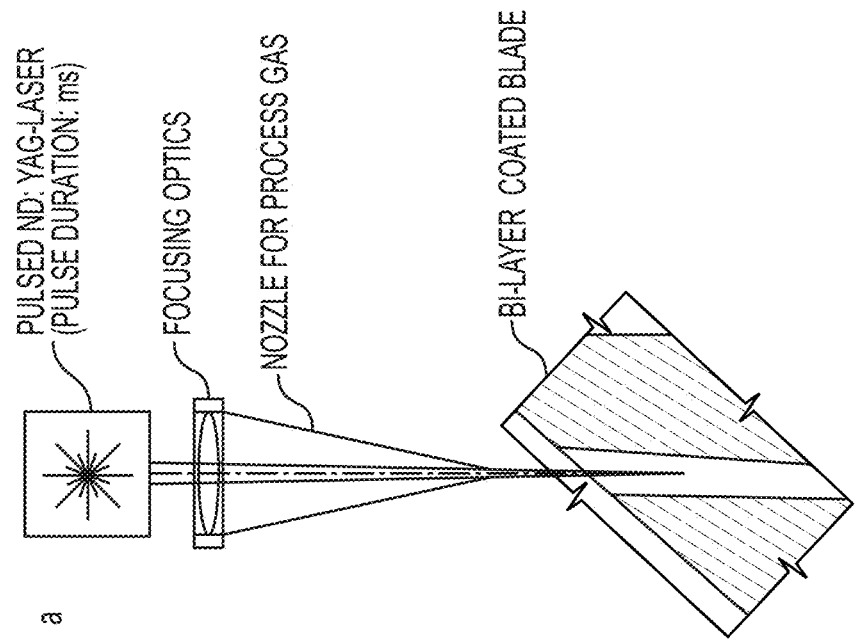

Many turbine blade cylindrical holes also require a 3D-shaped exit hole, and the corresponding hole assume a nozzle shape in which the complete hole has a conical form and the exit has a funnel shape to improve the cooling resulting from the air flow. The latter holes enable an effusion cooling with a thin film of cool air directly above the air-foil, resulting in a strong increase of the thermal shielding. This allows for higher turbine entrance temperatures, which in turn increases overall efficiency, which in turn reduces fuel consumption. Historically, these shapes were created by an EDM process (electrical discharge machining). Besides being very time consuming and expensive, EDM is limited to metallic materials. However, increasing turbine entrance temperatures generally requires ceramic thermal barrier coatings. Due to the large difference of the physical properties of the base material, the metallic as well as the ceramic coating, state of the art flash-lamp pulsed Nd:YAG lasers are not versatile enough to produce the required geometries with satisfactory quality because the energy in one single laser pulse is too high, giving rise to thermal stress especially in ceramic coatings, which in turn leads to micro cracks and spallation. One possible solution is to use two different laser setups, and to switch between the setups depending on the material to be drilled (e.g., ceramic or titanium). Laser ablation is the application of low energy laser pulses with high peak powers, and may be executed using a Q-switched Nd: YAG laser system. Such a Q-switched Nd:YAG laser is capable of producing pulse durations on the order of nanoseconds, with peak powers of ten to hundreds of $mW/cm^2$, and a material removal rate of a few micrometers per pulse. In comparison, a flash-lamp pumped Nd:YAG laser, as noted herein, has a pulse duration on the order of hundreds of microseconds, up to a millisecond, peak powers below $mW/cm^2$, and a material removal rate of tens to hundreds of micrometers per pulse. Generally, ablation dominates when a Q-switched Nd:YAG laser is used. For turbine blade shape drilling two different laser systems allow to selectively switch between the two setups and their corresponding processes, namely between ablation and melt expulsion. FIG. 8H illustrates these setups. The simplest application of laser ablation is to remove material from a solid surface in a controlled fashion. This process is shown as process b of FIG. 8H and is used to drill through the ceramic coating. Very short laser pulses remove material so quickly that the surrounding material absorbs very little heat, so laser drilling can be done on delicate or heat-sensitive materials like coated turbine blades. With an ablation depth per pulse of only about 1 μm and speed scanning optics with two moveable mirrors and a scan lens (F/theta-lens), the focused laser beam removes the material layer by layer by ablation. After a few seconds and hundreds of removed layers, a shaped hole is produced. The remainder of the hole is drilled using a pulse laser setup such as that of process a of FIG. 8H.

Figure 8I:
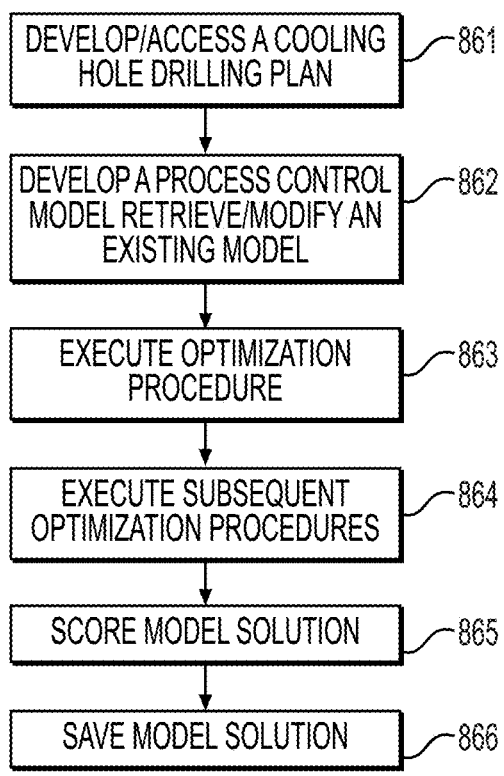

FIG. 8I illustrates a conceptual framework for optimal laser-drilling of cooling holes in a turbine blade. In FIG. 8I, framework 860 includes developing 861 a drilling plan or accessing an already-developed drilling plan. The drilling plan may specify for a particular turbine blade design, requirements for laser drilling of air cooling holes. The requirements may include the number of holes to be drilled. The requirements may further include, for each hole to be drilled, its location on the blade including entry coordinates, the identity and characteristics of the base metal in the vicinity of the hole, including material thickness; the presence of a coating, such as a ceramic coating, a corresponding exit hole and its location and characteristics, a shape of the hole including any variations in shape such as a conical section, the diameter or other size characteristic. The requirements may specify required internal protections. The requirements may specify quality control requirements.

The framework 860 also includes, developing 862 a process control model or retrieving, and possibly modifying, and existing process control model corresponding to the drilling plan. The process control model reflects the requirements of the drilling plan, including any constraints or restrictions. The process control model specifies the laser type, laser beam type, power, and expected number of pulses and their duration for each hole to be drilled. The process control model includes a distance between neighboring holes to be drilled, and other distances relevant to positioning the blade for drilling. The process control model may include a full or partial initial route for the drilling operation. The framework 860 further includes 863 an optimization procedure. The optimization procedure may include starting with an initial route, computing an initial cost employing a utility function that reflects the process control model, including constraints and restrictions, the operational characteristics of the drilling lasers, and the drilling route. The framework 860 still further includes 864 subsequent optimization operations that may include removal and reinsertion of single hole drilling and/or groups of similar hose drillings. Following the removal and reinsertion steps, the newly established route may be scored 865 taking into account factors similar to or identical with factors used to score the initial route. The removal and reinsertion steps and scoring steps may continue until an optimum cost (lowest cost) is achieved, or until a predetermined bound or a predetermined stopping point is achieved. The stopping point may be expressed in CPU time, calendar time, or any other time-based value. The stopping point may be the sooner of the predetermined bound or the time-based limit. Following the optimization steps, the framework 860 may include 866 saving the optimized process control plan, modifying the drilling plan according to the optimized process control plan, and saving and executing the modified drilling plan.

Another embodiment of use of the herein disclosed systems and methods relates to a general skill and preference matching of entities to available places, such as students to classes, job candidates to jobs, doctors for hospital placement, Uber® or Lyft® resources to deliveries, especially where there are multiple pick-up and delivery locations. The utility function is a complete picture of the entire matching and deployment landscape along with potential matches being made, and the penalty invoked within that landscape for any element that degrades the utility of a solution. With students to classes, there are class-size limitations, and there may be many unfilled preferences, or other items related to the status of students. There can also be impact to graduation date considerations related to not registering a particular student. With Uber® or Lyft® deliveries, there are the locations of the drivers, the pick-ups, and the drop-offs to be considered, along with other service-level commitments.

Yet another embodiment relates to further aspects of airplane scheduling. Besides a plurality of cities to be connected, and fliers that need to be matched to flights, it would be optimal to keep layovers to a minimum, and to plan the right amount of flight legs to the estimated need to maximize margin or yield whilst meeting customer demand. There are also courier planes, such as FedEx®, UPS®, and US Mail, and private and fractional ownership on demand travel to consider. The utility function enables the evaluation of every decision that can be made related to the ecosystem.

Yet another embodiment relates to single project scheduling, such as for construction of a new automobile or aircraft. In this case there are laboratory resources and staff requirements to be planned and scheduled, and there is a critical path to be followed when allotting time for each of these resources along the way. The utility model quantifies both the tangible and intangible characteristics of each candidate project schedule.

Yet another embodiment relates to multiple project scheduling and resource sharing, such as for simultaneous design and construction of several new automobiles or aircraft. This is an extremely challenging problem that is not solvable by existing tools. In this case there are laboratory resources and staff requirements to be planned and scheduled and shared by each of the projects, and there is a critical path for each to be followed when allotting time for each of these resources along the way for each project. The utility model quantifies both the tangible and intangible characteristics of each candidate multi-project schedule.

FIGS. 9-12 are additional flowcharts illustrating example operations of the example system of FIG. 4. In general, the example operations are directed to optimizing control of a process. The process includes a computer receiving a process definition and a collection of elements that need to be arranged in a way that optimizes the utility of the process; initializing the process using a collection of discrete elements (stops, events, work orders, tasks, locations, etc.), and producing a solution for said collection by inserting the elements into the solution using the Minimum Insertion Heuristic. The process further includes modifying the order of the elements to be inserted and continuing the process to produce solutions with better scores; and continuing to produce solutions based on improving the order of insertion until the process is determined to be sufficiently optimized.

Figure 9:
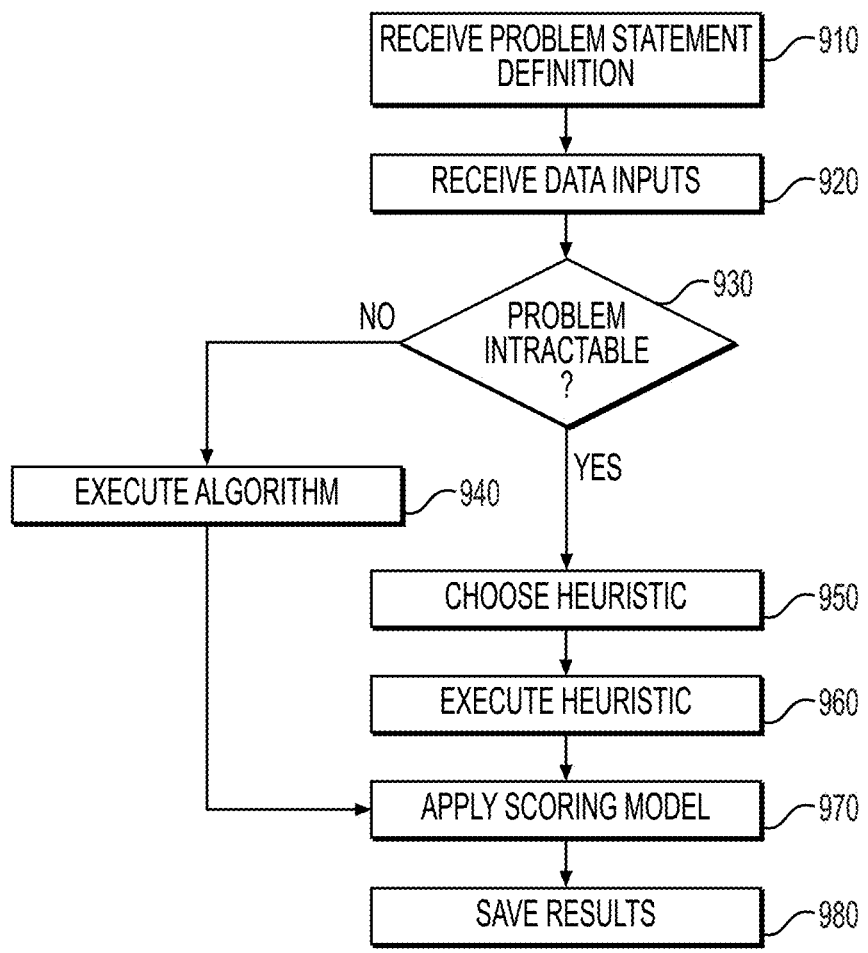
FIGS. 9-12 are flowcharts illustrating example methods executed through operation of the example system of FIG. 4.

In an embodiment as shown in FIG. 9, operation 900 begins in block 910 when the computer system 102 receives a problem statement/definition. The problem statement may be an existing statement previously stored in data store 130, or may be a new or modified problem statement. As an example, the statement may take the form: for a set T of tasks t, and for each task t∈T, a task length l(t), a task release time r(t), and a task deadline d(t); is there any schedule/assignment plan that satisfies the release times and the deadlines, in view of any hard constraints. Referring again to FIG. 7, hard constraints may take the form of specific skills that must be matched to specific requirements. (Other constraints, specifically "soft constraints" may be easily incorporated in the utility function.) In the context of the example of FIG. 7, a soft constraint may be a preference of a worker. In addition, some soft constraints (possibly preferences), if not honored, might result in a penalty that should be included in the utility function. For example, all workers may prefer not to work overtime, and any assigned overtime work incurs a penalty.) Following block 910, operation 900 moves to block 920 when the computer system 102 receives data inputs. The data inputs may be points to be evaluated and data related to the points. Referring again to FIG. 7, the data inputs may include each of the patients, their location, their requirements, and their preferences; and similar data for each of the healthcare workers. The data inputs further may include penalties associated with failure to honor any constraints or preferences. As part of the data intake process, the computer system 102 may identify any conflicts with the data inputs, and redundancies in the data inputs, and any missing data inputs. Following pre-processing of the data intake, operation moves to block 930. In block 930, the computer system 102 determines which constraints are operable based on the problem statement, and determines whether the problem is intractable. In an aspect, the processing of block 930 may be based on a bound on processing time and/or a stopping condition (which may be synonymous with the bound). If the problem is not intractable, the operation 900 moves to block 940 and the computer system executes an algorithm to attempt a solution to the stated problem. In this context, the computer system 102 may determine the problem is not intractable if the problem may be solved in polynomial time or near-polynomial time using an exact algorithm. As an example, for a process control problem with a sufficiently small search space, the computer system may determine the problem may be solved with one minute of CPU time. Note further, however, that constraints, restrictions, preferences and penalties specified in the problem description still are counted in the utility function. If the problem is intractable, the operation 900 moves to block 950 and the computer system 102 chooses, and then in block 960, executes, an appropriate heuristic algorithm to attempt to find a most optimum solution considering an assigned bound and defined stopping point. Following block 960 as well as block 940, the computer system executes, block 970, a utility function to account for various preferences, penalties, and other factors that may affect the final cost determination. Following block 970, operation 900 moves to block 980, and the results of the operation 900 are stored in data store 130.

Figure 10:
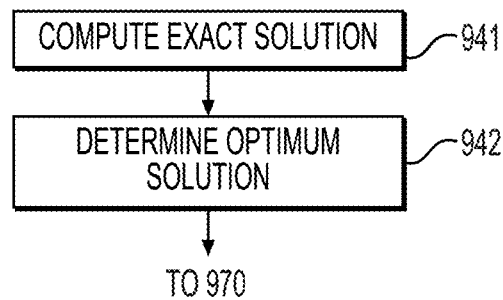

FIG. 10 is a block diagram illustrating operations of block 940. In block 941, operation 940a, the computer system 102 computes an exact solution to the problem, without regard to complexities such as preferences and penalties, but respecting restrictions and constraints. In theory, the computer system 102 should generate a result of the algorithm approximately or exactly N-factorial times; the solution having the lowest "cost" then, in block 942, is designated as the exact (i.e., optimum) solution considering only the data inputs required by the exact algorithm. Following block 942, operation 940a moves to block 970.

Figure 11:
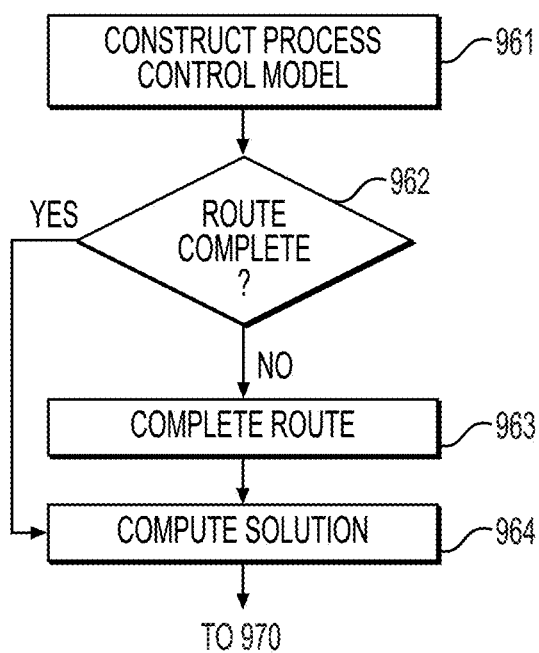

FIG. 11 is a block diagram illustrating operations of block 960. In FIG. 11, operation 960a begins in block 961 with the computer system 102 constructing a full or partial process control model, or retrieving, and possibly modifying, an existing process control model. The process control model reflects the real-life process to be controlled. For example, the process control model may reflect an actual process for assigning commercial aircraft to fly specific routes; a process for assigning visiting health care workers to patients; a process for laser inspections of a turbine blade (after use as part of a preventive maintenance plan or prior to use as part of an initial quality control plan); and a process for laser drilling cooling air holes in a turbine blade as part of the blade manufacturing process. The process control model may reflect constraints, restrictions, and preferences that would be imposed in executing the actual process, and any penalties associated with the constraints, restrictions or preferences. The process control model may reflect a complete "route," a partial "route," or no "route." That is, the process control model may be structured in such a way as to require or impose an option to complete the "route" before or during a subsequent process control model optimization.

In block 962, the computer system 102 determines if the "route" is complete (that is, is the assignment of items to point in the assignment plan complete such that each point is accounted for?). If the route is complete, the operation 960a moves to block 964. Otherwise, the operation 960a moves to block 963. In block 963, the computer system 102 completes assignment of items to points in the assignment plan. However, if starting with a partial plan, the items may be inserted between points so as to reduce the cost of the process control model. If the "route" has not been started, the computer system 102 generates a "route" or assignment plan, and may do so using an optimization scheme. Following block 963, the operation 960a moves to block 964.

In block 964, the computer system 102 executes the exact algorithm to generate and rank all possible iterations of the process control model. In block 964, the computer system 102 executes to generate an optimum solution, disregarding externalities such as preferences and penalties. In executing the operations of block 960, the computer system 102 inserts items into or between two existing items. The item to be inserted may be a new, previously unused item, or an item removed from another point. The computer system 102 inserts, or inserts the item between existing items provided the cost of the insertion is no more than the cost of not inserting the item at that point. The process of removal and reinsertion is repeated until a stopping point is reached, a bound is reached, or an optimum approximate solution is generated. Following blocks 964, the operation 960a ends, and operation 900 continues to block 970.

Figure 12:
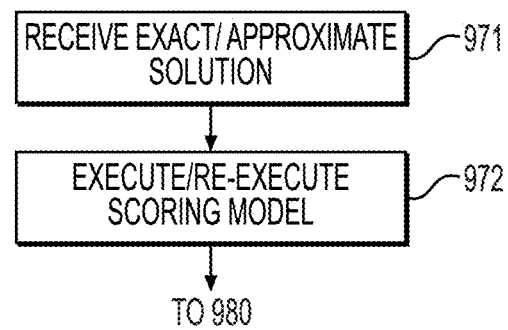

FIG. 12 is a block diagram illustrating operations of block 970. In FIG. 12, operation 970a begins in block 971 with the computer system receiving either the exact solution or an optimized approximate solution. In block 972, the computer system executes the utility function associated with the problem definition. The utility function accounts for all complexities (e.g., preferences, penalties) not accounted for in the optimization process. Execution of the utility function may affect both an exact solution or an approximate solution. If application of the utility function increases the cost of either solution above that achieved during the operation of block 964, the operation 970a may return to block 964, as appropriate, and a next higher cost "route" may be used with the utility function. This process may continue until a lowest cost "route" or assignment plan, considering all complexities of the problem, is achieved. Alternately, the utility function may be applied to the exact solution and each application of the approximate algorithm. Following all scoring operations of operation 970a, the operation 970a moves to block 980.

Certain of the devices shown in the Figures include a computing system. The computing system includes a processor (CPU) and a system bus that couples various system components including a system memory such as read only memory (ROM) and random-access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 9-12. The disclosed devices, components, and systems contemplate using or implementing any suitable technique for performing the steps illustrated. Thus, FIGS. 9-12 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

REFERENCES

[1] An Effective Heuristic Algorithm for the Traveling-Salesman Problem, S. Lin & B. W. Kernighan, Oper. Res. 21, 498-516 (1973).
[2] *An Effective Implementation of the Lin-Kernighan Traveling Salesman Heuristic*, Keld Helsgaun, E-mail: keld@ruc.dk, Department of Computer Science, Roskilde University, DK-4000 Roskilde, Denmark (2000).

The preceding disclosure refers to flowcharts and accompanying descriptions to illustrate the embodiments represented in FIGS. 1-4. The disclosed devices, components, and systems contemplate using or implementing any suitable technique for performing the steps illustrated. Thus, FIGS. 1, 7B, and 9-12 are for illustration purposes only and the described or similar steps may be performed at any appropriate time, including concurrently, individually, or in combination. In addition, many of the steps in the flowcharts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A computer-implemented method for optimizing control of a process representing an intractable problem with a problem size having an exponential time complexity, comprising:
receiving by a processor, a model defining a utility of the process, and a description of elements in a collection of discrete elements, the elements to be inserted into sequences of discrete elements to optimize the utility of the process representing the intractable problem with a problem size having an exponential time complexity;

identifying by the processor a best insertion order for the elements, comprising:
using one or more non-genetic techniques of a Travelling Salesman Problem (TSP) tour solver, generating an initial insertion order for the elements,
applying a heuristic algorithm having a general utility function to the elements, one element at a time, in an order defined by the initial insertion order, thereby generating an initial process control solution,
determining a goodness of the initial process control solution by scoring a general utility function result derived from applying the heuristic algorithm to the initial insertion order,
after generating the initial insertion order, and after applying the heuristic algorithm and determining a goodness of the initial process control solution, using the one or more non-genetic techniques of a Travelling Salesman Problem (TSP) tour solver, iteratively generating subsequent insertion orders, and
iteratively repeating the applying, determining, and scoring to each of the subsequent insertion orders, retaining as a current best insertion order, an insertion order that produces a current maximum score of the general utility function, until a stopping condition is reached, wherein the stopping condition is selected from a group consisting of diminished returns of the utility optimization process, a predetermined time criteria, reaching a predetermined number of iterations through the utility optimization process, and reaching a current best solution; and
using the current best solution to control the process.

2. The method of claim 1, wherein the process is used to operate a turbine blade laser drilling machine.

3. The method of claim 1, wherein the process comprises a general routing and scheduling problem, wherein resources are selected to visit jobs with location (distance), time-window, availability, skill and preferences, and bin-packing constraints.

4. The method of claim 3, wherein the resources comprise specialty constraints, including predecessor, successor, simultaneous, and asynchronous jobs.

5. The method of claim 1, wherein the process comprises a single project scheduler involving labs, shops, and resource constraints necessary for a project to be completed.

6. The method of claim 1, wherein the process comprises a collection of multiple projects that are to be completed and that will share several labs, shops, and resources.

7. The method of claim 1, wherein the process comprises a collection of multiple students and classrooms to be properly matched.

8. The method of claim 1, wherein the process comprises a collection of airplane, train, or bus schedules given restrictions of materials and expected travelers.

9. The method of claim 1, wherein the process comprises a warehouse with robots and tasks to complete.

10. A non-transitory, computer-readable storage medium having encoded thereon, machine instructions for optimally controlling a process representing an intractable problem with a problem size having an exponential time complexity, wherein a processor executes the instructions to:
receive a model defining a utility of the process, and a description of elements in a collection of discrete elements, the elements to be inserted into sequences of discrete elements to optimize the utility of the process representing the intractable problem with a problem size having an exponential time complexity;
identify a best insertion order for the elements, wherein the processor:
using one or more non-genetic techniques of a Travelling Salesman Problem (TSP) tour solver, generates an initial insertion order for the elements,
applies a heuristic algorithm having a general utility function to the elements one element at a time in an order defined by the initial insertion order, thereby creating an initial process control solution,
determines a goodness of the initial process control solution by scoring a general utility function result derived from applying the heuristic algorithm to the initial insertion order,
after generating the initial insertion order, and after applying the heuristic algorithm and determining a goodness of the initial process control solution, using the one or more non-genetic techniques of a Travelling Salesman Problem (TSP) tour solver, iteratively generates subsequent insertion orders, and
iteratively repeats the applying, determining, and scoring to each of the subsequent insertion orders, retaining as a current best insertion order, an insertion order that produces a current maximum score of the general utility function, until a stopping condition is reached, wherein the stopping condition is selected from a group consisting of diminished returns of the utility optimization process, a predetermined time criteria, reaching a predetermined number of iterations through the utility optimization process, and reaching a current best solution; and
uses the current best solution to control the process.

11. The non-transitory, computer-readable storage medium of claim 10, wherein the process is used to operate a turbine blade laser drilling machine.

12. The non-transitory, computer-readable storage medium of claim 10, wherein the process comprises a general routing and scheduling problem, wherein resources are selected to visit jobs with location (distance), time-window, availability, skill and preferences, and bin-packing constraints.

13. The non-transitory, computer-readable storage medium of claim 12, wherein the resources comprise specialty constraints, including predecessor, successor, simultaneous, and asynchronous jobs.

14. The non-transitory, computer-readable storage medium of claim 10, wherein the process comprises a single project scheduler involving labs, shops, and resource constraints necessary for a project to be completed.

15. The non-transitory, computer-readable storage medium of claim 10, wherein the process comprises a collection of multiple projects that are to be completed and that will share several labs, shops, and resources.

16. The non-transitory, computer-readable storage medium of claim 10, wherein the process comprises a collection of multiple students and classrooms to be properly matched.

17. The non-transitory, computer-readable storage medium of claim 10, wherein the process comprises a collection of airplane, train, or bus schedules given restrictions of materials and expected travelers.

18. The non-transitory, computer-readable storage medium of claim 10, wherein the process comprises a warehouse with robots and tasks to complete.

19. A computer-implemented method for controlling a process, comprising:
a processor receiving a model comprising a collection of elements and a utility function, each of the elements requiring one or more resources and imposing one or more constraints on the resources, one or more of the resources comprising one or more preferences, the elements to be inserted into element sequences to optimize a utility, the process representing an intractable problem with a problem size having an exponential time complexity;

the processor identifies a best insertion for the elements and a corresponding best process control solution, comprising the processor:

using one or more non-genetic techniques of a Travelling Salesman Problem (TSP) tour solver, generating an initial insertion order, the initial insertion order comprising discrete elements from the collection of elements, applying a heuristic algorithm having a general utility function to the elements of the initial insertion order, one element at a time, in an order defined by the initial insertion order, thereby generating an initial process control solution, testing a goodness of the initial process control solution by scoring an output of the general utility function resulting from applying the heuristic algorithm to the initial insertion order, and after generating the initial insertion order, and after applying the heuristic algorithm and determining a goodness of the initial process control solution, the processor:

using the one or more non-genetic techniques of a Travelling Salesman Problem (TSP) tour solver, iteratively generates subsequent insertion orders;

repeats the applying and testing for each of the subsequent insertion orders, retaining as a current best observed insertion order and corresponding current best observed process control solution, an insertion order that produces a maximum score of the general utility function until the method reaches a stopping condition; and using the best observed process control solution to control the process.

20. The method of claim 19, wherein the stopping condition comprises one of diminished returns of the general utility function, timed criteria, and reaching a maximum number of iterations through the method.

* * * * *